United States Patent
Sen et al.

(10) Patent No.: US 12,214,808 B2
(45) Date of Patent: *Feb. 4, 2025

(54) SYSTEMS AND METHODS FOR DETECTING ACTORS WITH RESPECT TO AN AUTONOMOUS VEHICLE

(71) Applicant: Aurora Operations, Inc., Pittsburgh, PA (US)

(72) Inventors: Abhishek Sen, Pittsburgh, PA (US); Ashton James Fagg, Pittsburgh, PA (US); Brian C. Becker, Pittsburgh, PA (US); Yang Xu, Pittsburgh, PA (US); Nathan Nicolas Pilbrough, Pittsburgh, PA (US); Carlos Vallespi-Gonzalez, Wexford, PA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 42 days.

This patent is subject to a terminal disclaimer.

(21) Appl. No.: 18/178,641

(22) Filed: Mar. 6, 2023

(65) Prior Publication Data

US 2023/0242160 A1 Aug. 3, 2023

Related U.S. Application Data

(63) Continuation of application No. 16/838,674, filed on Apr. 2, 2020, now Pat. No. 11,597,406.

(Continued)

(51) Int. Cl.
*B60W 60/00* (2020.01)
*G01S 7/48* (2006.01)
(Continued)

(52) U.S. Cl.
CPC ....... *B60W 60/0027* (2020.02); *G01S 7/4808* (2013.01); *G01S 17/58* (2013.01);
(Continued)

(58) Field of Classification Search
None
See application file for complete search history.

(56) References Cited

U.S. PATENT DOCUMENTS

| 9,632,502 | B1 | 4/2017 | Levinson et al. |
| 10,627,818 | B2 | 4/2020 | Sapp et al. |

(Continued)

FOREIGN PATENT DOCUMENTS

| DE | 102019127229 | 4/2020 |
| JP | 2017056935 | 3/2017 |

OTHER PUBLICATIONS

Charron et al, "De-Noising of Lidar Point Clouds Corrupted by Snowfall", 2018, IEEE (Year: 2018).

(Continued)

*Primary Examiner* — Hussein Elchanti
*Assistant Examiner* — Kenneth M Dunne
(74) *Attorney, Agent, or Firm* — Dority & Manning, P.A.

(57) ABSTRACT

An autonomous vehicle computing system can include a primary perception system configured to receive a plurality of sensor data points as input and generate primary perception data representing a plurality of classifiable objects and a plurality of paths representing tracked motion of the plurality of classifiable objects. The autonomous vehicle computing system can include a secondary perception system configured to receive the plurality of sensor data points as input, cluster a subset of the plurality of sensor data points of the sensor data to generate one or more sensor data point clusters representing one or more unclassifiable objects that are not classifiable by the primary perception system, and generate secondary path data representing tracked motion of the one or more unclassifiable objects. The autonomous (Continued)

vehicle computing system can generate fused perception data based on the primary perception data and the one or more unclassifiable objects.

20 Claims, 9 Drawing Sheets

Related U.S. Application Data

(60) Provisional application No. 62/978,548, filed on Feb. 19, 2020.

(51) Int. Cl.
  *G01S 17/58* (2006.01)
  *G01S 17/66* (2006.01)
  *G01S 17/931* (2020.01)
  *G05D 1/00* (2024.01)
  *G06N 20/00* (2019.01)

(52) U.S. Cl.
  CPC ............ *G01S 17/66* (2013.01); *G01S 17/931* (2020.01); *G05D 1/0088* (2013.01); *G05D 1/0214* (2013.01); *G06N 20/00* (2019.01); *B60W 2420/408* (2024.01); *B60W 2554/4026* (2020.02); *B60W 2554/4029* (2020.02); *B60W 2554/4042* (2020.02); *B60W 2554/4043* (2020.02); *B60W 2554/4044* (2020.02)

(56) References Cited

U.S. PATENT DOCUMENTS

| | | |
|---|---|---|
| 2005/0007450 A1 | 1/2005 | Hill et al. |
| 2017/0072850 A1 | 3/2017 | Curtis et al. |
| 2019/0285752 A1 | 9/2019 | Chattopadhyay et al. |
| 2019/0286907 A1* | 9/2019 | Wu ........................ G06V 20/58 |
| 2020/0097010 A1 | 3/2020 | Maila et al. |
| 2020/0189573 A1 | 6/2020 | King et al. |

OTHER PUBLICATIONS

Che et al, "Object Recognition, Segmentation, and Classification of Mobile Laser Scanning Point Clouds: A state of the art review", Feb. 2019, MDPI (Year: 2019).

* cited by examiner

SYSTEMS AND METHODS FOR DETECTING ACTORS WITH RESPECT TO AN AUTONOMOUS VEHICLE

CROSS REFERENCE TO RELATED APPLICATIONS PRIORITY CLAIM

The present application is a continuation of U.S. application Ser. No. 16/838,674 having a filing date of Apr. 2, 2020, issued as U.S. Pat. No. 11,597,406 on Mar. 7, 2023, which claims filing benefit of U.S. Provisional Patent Application Ser. No. 62/978,548 having a filing date of Feb. 19, 2020. Applicant claims priority to and the benefit of each of such applications and incorporates all such applications herein by reference in its entirety.

FIELD

The present disclosure relates generally to autonomous vehicles. More particularly, the present disclosure relates to perception systems configured to perceive a surrounding of an autonomous vehicle.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given such knowledge, an autonomous vehicle can navigate through the environment.

SUMMARY

Aspects and advantages of implementations of the present disclosure will be set forth in part in the following description, or can be learned from the description, or can be learned through practice of the implementations.

One example aspect of the present disclosure is directed to a computer-implemented method for perceiving movement of objects with respect to an autonomous vehicle. The computer-implemented method can include obtaining, by a computing system having one or more computing devices, sensor data including a plurality of sensor data points. The computer-implemented method can include generating, by a primary perception system of the computing system and based on the sensor data, primary perception data. The primary perception data can represented a plurality of classifiable objects and a plurality of paths representing tracked motion of the plurality of classifiable objects. Each classifiable object can classified by the primary perception system as a predefined class of a plurality of predefined classes of objects. The computer-implemented method can include clustering, by a secondary perception system of the computing system that is different from the primary perception system, a subset of the plurality of sensor data points of the sensor data to generate one or more sensor data point clusters representing one or more unclassifiable objects that are not classifiable by the primary perception system as any one of the plurality of predefined classes of objects. The computer-implemented method can include generating, by the secondary perception system, secondary path data representing tracked motion of the one or more unclassifiable objects. The computer-implemented method can include determining, by the computing system, fused perception data representing the tracked motion of the plurality of classifiable objects and the tracked motion of the one or more unclassifiable objects.

Another example aspect of the present disclosure is directed to an autonomous vehicle system. The autonomous vehicle system can include a memory that stores a set of instructions. The autonomous vehicle system can include a primary perception system that is configured to receive sensor data including a plurality of sensor data points as input and, in response to receipt of the sensor data as input, generate primary perception data representing a plurality of classifiable objects and a plurality of paths representing tracked motion of the plurality of classifiable objects, wherein each classifiable object is classified by the primary perception system as a predefined class of a plurality of predefined classes of objects. The autonomous vehicle system can include a secondary perception system that is configured to receive the sensor data including the plurality of sensor data points as input, and, in response to receipt of the sensor data as input, cluster a subset of the plurality of sensor data points of the sensor data to generate one or more sensor data point clusters representing one or more unclassifiable objects that are not classifiable by the primary perception system as any one of the plurality of predefined classes of objects and generate secondary path data representing tracked motion of the one or more unclassifiable objects.

The autonomous vehicle system can include one or more processors which use the set of instructions to perform operations. The operations can include obtaining, by the one or more processors, the sensor data including the plurality of sensor data points. The operations can include generating, by the primary perception system, the primary perception data representing the plurality of classifiable objects and the plurality of paths representing the tracked motion of the plurality of classifiable objects. The operations can include clustering, by the secondary perception system, the subset of the plurality of sensor data points of the sensor data to generate the one or more sensor data point clusters representing the one or more unclassifiable objects. The operations can include generating, by the secondary perception system, the secondary path data representing the tracked motion of the one or more unclassifiable objects. The operations can include determining, by the one or more processors, fused perception data representing the tracked motion of the plurality of classifiable objects and the tracked motion of the one or more unclassifiable objects.

Another example aspect of the present disclosure is directed to an autonomous vehicle. The autonomous vehicle can include a memory that stores a set of instructions. The autonomous vehicle can include an autonomous vehicle system. The autonomous vehicle system can include a primary perception system that is configured to receive sensor data including a plurality of sensor data points as input and, in response to receipt of the sensor data as input, generate primary perception data representing a plurality of classifiable objects and a plurality of paths representing tracked motion of the plurality of classifiable objects, wherein each classifiable object is classified by the primary perception system as a predefined class of a plurality of predefined classes of objects. The autonomous vehicle system can include a secondary perception system that is configured to receive the sensor data including the plurality of sensor data points as input, and, in response to receipt of the sensor data as input, cluster a subset of the plurality of sensor data points of the sensor data to generate one or more sensor data point clusters representing one or more unclassifiable objects that are not classifiable by the primary perception system as any one of the plurality of predefined classes of objects and generate secondary path data representing tracked motion of the one or more unclassifiable objects.

The autonomous vehicle system can include one or more processors which use the set of instructions to perform operations. The operations can include obtaining, by the one or more processors, the sensor data including the plurality of sensor data points. The operations can include generating, by the primary perception system, the primary perception data representing the plurality of classifiable objects and the plurality of paths representing the tracked motion of the plurality of classifiable objects. The operations can include clustering, by the secondary perception system, the subset of the plurality of sensor data points of the sensor data to generate the one or more sensor data point clusters representing the one or more unclassifiable objects. The operations can include generating, by the secondary perception system, the secondary path data representing the tracked motion of the one or more unclassifiable objects. The operations can include determining, by the one or more processors, fused perception data representing the tracked motion of the plurality of classifiable objects and the tracked motion of the one or more unclassifiable objects.

Other aspects of the present disclosure are directed to various systems, apparatuses, non-transitory computer-readable media, user interfaces, and electronic devices.

These and other features, aspects, and advantages of various implementations of the present disclosure will become better understood with reference to the following description and appended claims. The accompanying drawings, which are incorporated in and constitute a part of this specification, illustrate example implementations of the present disclosure and, together with the description, serve to explain the related principles.

BRIEF DESCRIPTION OF THE DRAWINGS

Detailed discussion of implementations directed to one of ordinary skill in the art is set forth in the specification, which refers to the appended figures, in which.

DETAILED DESCRIPTION

Figure 1:
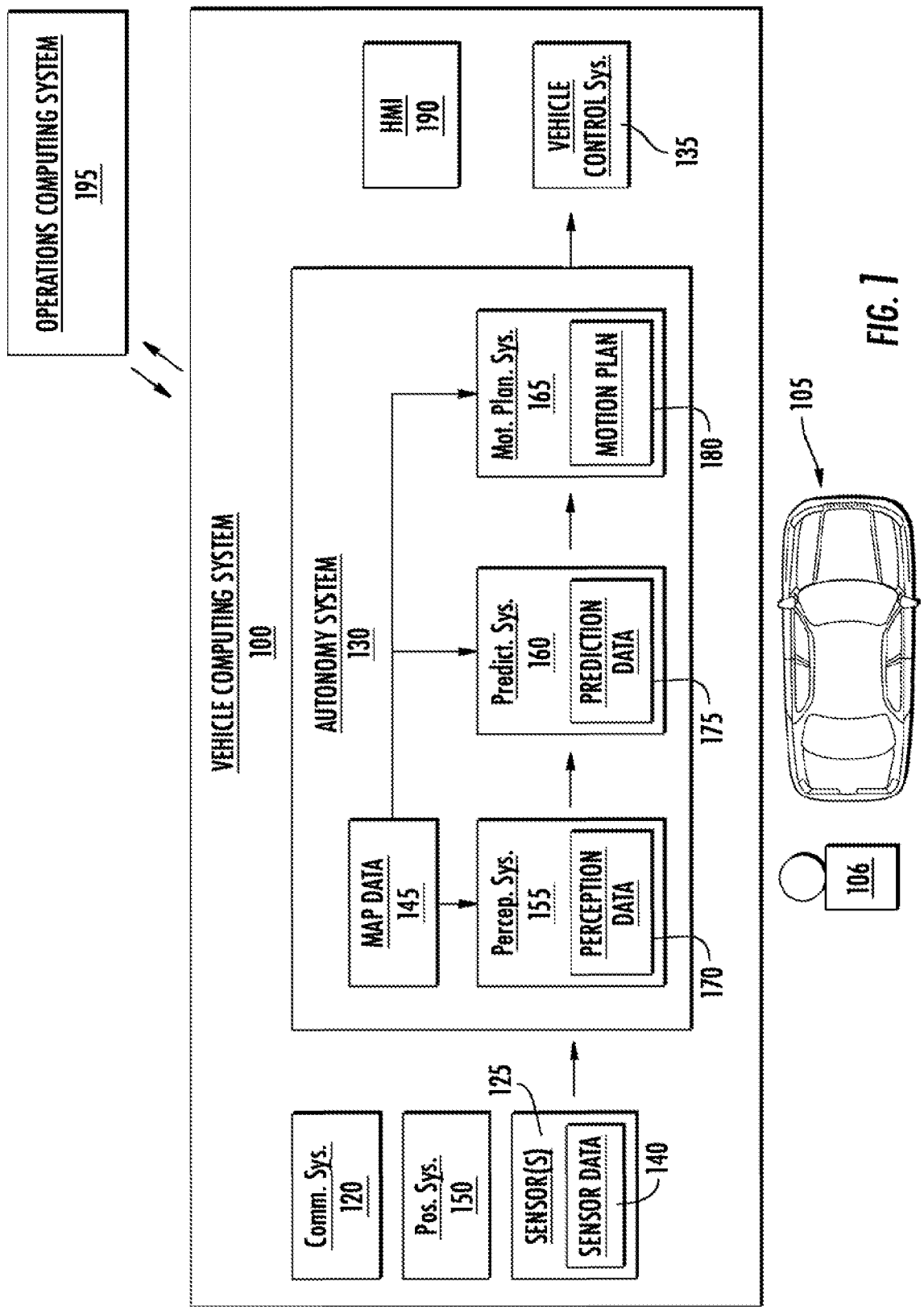
FIG. 1 depicts an example system overview according to example implementations of the present disclosure.

Generally, the present disclosure is directed to systems and methods for detecting and/or accounting for unclassifiable, unclassified, and/or uncategorized actors with respect to an autonomous vehicle. Aspects of the present disclosure are directed to perception systems operable to detect and/or perceive surroundings of an autonomous vehicle. In particular, a perception system can include a primary perception system and a secondary perception system. The primary perception system can analyze sensor data to perceive objects, including static objects and/or dynamic objects (e.g., actors), and/or determine paths (e.g., prior and/or current paths) representing tracked motion (e.g., heading, speed, trajectory over time, such as a previous time interval) of the objects and/or classify/categorize the objects. For instance, the primary perception system can assign a class to a given object to broadly define its characteristics (e.g., bus, truck, car, bike, pedestrian). The characteristics assigned by the class can be used by an autonomous vehicle navigation system including the perception system to, for example, determine navigational aspects and/or constraints of the objects and/or determine future paths for the objects and/or the autonomous vehicle. The secondary perception system can be generally configured to determine (e.g., estimate) paths representing tracked motion (e.g., heading, speed, trajectory over time, etc.) for objects for which paths are not satisfactorily identified by the primary perception system. For example, such objects can be unclassifiable, unclassified, and/or improperly classified by the primary perception system. The secondary perception system can analyze some or all of the sensor data to determine respective velocities and/or paths for the such unclassifiable and/or unclassified objects (e.g., which can be identified as clusters of sensor data points). For example, the secondary perception system can analyze all of the sensor data and/or filter the sensor data to remove classified sensor data and/or nonviable sensor data. Examples of sensor data that can be excluded from processing by the secondary perception sensor data include sensor data that is spurious, already classified by the primary perception system, outside of one or more region of interest (RoI) of an autonomous vehicle, and/or any other suitable classified and/or nonviable sensor data, or combination thereof. The secondary perception system can cluster sensor data points of the sensor data to determine respective velocities and/or paths for the clusters of the sensor data points. In this way, the secondary perception system can determine paths for objects (e.g., the sensor data point clusters) in a class-agnostic manner. The secondary perception system can act as a "fallback" perception system that serves to account for objects at a simpler and/or lower level of understanding than the primary perception system, but with greater reliability. For example, objects that are not properly categorized by the secondary perception system may not be properly accounted for by the secondary perception system. However, the secondary perception system may not categorize objects and thus, may be better suited to identify and account for objects that are difficult to categorize. Thus, the secondary perception system can add an extra level of certainty and safety to an autonomous vehicle navigation system while still providing the benefits of high-level understanding associated with (e.g., provided by) the primary perception system.

More particularly, an autonomous vehicle can be a ground-based autonomous vehicle (e.g., car, truck, bus, bike, scooter, etc.) or another type of vehicle (e.g., aerial vehicle, etc.) that can operate with minimal and/or no interaction from a human operator. An autonomous vehicle can include a vehicle computing system located onboard the autonomous vehicle to help control the autonomous vehicle. The vehicle computing system can be located onboard the autonomous vehicle, in that the vehicle computing system can be located on or within the autonomous vehicle. The vehicle computing system can include one or more sensor(s), an autonomy computing system (e.g., for determining autonomous navigation), one or more vehicle control system(s) (e.g., for controlling braking, steering, powertrain, etc.), and/or other systems. The vehicle computing system can obtain sensor data from sensor(s) onboard the vehicle, attempt to comprehend the vehicle's surrounding environment by performing various processing techniques on the sensor data, and generate an appropriate motion plan through the vehicle's surrounding environment.

An autonomous vehicle can predict or anticipate movements of other actors (e.g., vehicles, pedestrians, cyclists, and the like) proximate the autonomous vehicle to more safely and efficiently maneuver through traffic. For instance, a prediction system can be configured to receive perception data from a perception system describing an "understanding" of a scene proximate an autonomous vehicle. For example, perception data can identify objects and/or actors defined by sensor data. Additionally and/or alternatively, the perception data can define paths for objects and/or actors. For example, a path can illustrate by any suitable means how an object and/or actor has been moving and/or is currently moving. For example, a path can include a velocity for an object (e.g., a speed and/or a direction for an object). As used herein, a "trajectory" can also refer to a path. The perception data can be provided to a prediction system and used at least in part to determine a motion plan for an autonomous vehicle. Example aspects of the present disclosure are directed to a perception system configured to identify perception data for an autonomous vehicle.

A computing system (e.g., the vehicle computing system) can receive sensor data including one or more sensor data points from one or more sensors that are coupled to or otherwise included within the autonomous vehicle. For example, in some implementations, a perception system can be included within the vehicle computing system and configured to receive the sensor data. As examples, the sensor(s) can include a Light Detection and Ranging (LIDAR) system, a Radio Detection and Ranging (RADAR) system, one or more cameras (e.g., visible spectrum cameras, infrared cameras, etc.), a positioning system (e.g., GPS), and/or other sensors. The sensor data can include information that describes the location of static objects and/or dynamic objects (actors) within the surrounding environment of the autonomous vehicle. For example, the objects can include traffic signals, additional vehicles, pedestrians, bicyclists, signs (e.g., stop signs, yield signs), and/or other objects. The sensor data can include raw sensor data and/or data that has been processed or manipulated in some manner before being provided to other systems within the autonomy computing system.

In some implementations, sensor data can define and/or include a representation of a spatial division proximate an autonomous vehicle. For example, in some implementations, each sensor data point of the sensor data can represent a space in a "grid" discretizing a region proximate an autonomous vehicle. For example, in some implementations, each sensor data point can represent a grid of about 33 centimeters.

In addition to the sensor data, the vehicle computing system (e.g., the perception system) can retrieve or otherwise obtain map data that provides detailed information about the surrounding environment of the autonomous vehicle. The map data can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, and/or instructions of signage (e.g., stop signs, yield signs), traffic lights (e.g., stop lights), or other traffic signals or control devices/markings (e.g., cross walks)); and/or any other map data that provides information that assists the vehicle computing system in comprehending and perceiving its surrounding environment and its relationship thereto.

According to example aspects of the present disclosure, a computing system (e.g., the vehicle computing system) can generate primary perception data using a primary perception system. The primary perception data can be descriptive of a plurality of objects. For instance, the plurality of objects described by the primary perception data can be described at least in part by the sensor data. Additionally and/or alternatively, the plurality of objects described by the primary perception data can be described at least in part by the map data. In other words, the sensor data and/or map data can depict the plurality of objects (e.g., by capturing and/or representing the objects in data). The primary perception data can serve to identify and/or otherwise describe the objects depicted by the sensor data and/or the map data in a computer-readable and/or operable manner.

Additionally and/or alternatively, the primary perception data can be descriptive of path data that describes and/or identifies a plurality of paths with respect to the autonomous vehicle and respectively associated with (e.g., describing tracked motion of) the plurality of objects. A path can describe or illustrate, by any suitable means, how an object and/or actor has been moving (e.g., over a previous time interval), is currently moving (e.g., at a current time instance), and/or is projected to move (e.g., over a future time interval, such as by a heading (e.g., a magnitude and/or a direction)). For instance, a path can define and/or include one or more velocities for an object (e.g., a speed and/or a direction for an object), such as one or more current velocities and/or one or more prior velocities. As one example, a path can depict motion (e.g., tracked motion) of an object by a time series of prior positions and/or velocities with respect to the autonomous vehicle and/or absolutely (e.g., geospatially).

Additionally and/or alternatively, the primary perception data can be descriptive of at least one classification label respectively associated with (e.g., describing motion of) at least one of a plurality of objects (e.g., classifiable objects) described by the primary perception data. For instance, at least one classification label can be an identifier of an object as belonging to a class (e.g., a predefined class) of similar objects. Class and/or category examples can include entity type (e.g., motor vehicle, nonpowered vehicle, pedestrian, etc.) and/or vehicle type (e.g., bicycle, car, truck, bus, etc.). Thus, the primary perception can classify objects that are identifiable as belonging to particular predefined class.

In some implementations, the primary perception system can generate the primary perception data using class-based assumptions about the objects. For example, the primary perception data can be generated by classifying the objects with respect to the predefined classes of the primary perception system (e.g., vehicle, pedestrian, etc.) and generating the primary perception data based at least in part on characteristics of those classes. Thus, the primary perception system can use information describing respective classes of the objects to determine paths of the objects.

In some implementations, the classes can be learned through training of the primary perception system on a corpus of training data. For instance, the primary perception system can employ one or more machine-learned object detection and/or classification models configured to receive at least sensor data as input and, in response to receipt of the sensor data, provide an output including, for example, primary perception data including identification of at least one of objects, path data, or classification labels. In some implementations, training data can include sets of sensor data labeled with object data (e.g., a bounding box surrounding an object, list of sensor data points comprising the object, etc.), path data, and/or classification label data (e.g., an established class of one or more objects in the training data). In some implementations, the classes can be selected based on common objects encountered in a vehicle context, such as an autonomous vehicle context. For example, a plurality of predefined classes can include, but is not limited to, a pedestrian class, a bicycle class, a vehicle class, a train class, a spurious class, a bus class, a semitruck class, an emergency vehicle class, or any other suitable classes.

Additionally and/or alternatively, one or more sensor data points in the sensor data can be classified as spurious (e.g., by the primary perception system). For instance, spurious sensor data points can be sensor data points that are unknown, uncertain, and/or otherwise unresolvable at the time of observation. As one example, spurious sensor data points can be sensor data points whose values are at least partially attributable to circumstances such as, but not limited to, rain, dust, snow, particulate matter, reflections, glare, obstructions (e.g., smudges on a camera and/or LIDAR sensor), and/or other suitable circumstance, and/or combination thereof. In some cases, spurious sensor data points can be resolved as an observation frame advances over time. In some implementations, one or more objects (e.g., a spurious object class) can be assigned to spurious sensor data points. In some implementations, nonviable sensor data points can include some or all of the spurious sensor data points. Thus, some or all of the spurious sensor data points can be excluded from clustering by a secondary perception system, as discussed in further detail below.

Although any suitable configuration of a primary perception system may be employed in accordance with example aspects of the present disclosure, example aspects of the present disclosure are discussed herein, for the purposes of illustration, with reference to a primary perception system including machine-learned object detection and/or classification models. The use of machine-learned object detection and/or classification models by a primary perception system to generate primary perception data can achieve several advantages. For instance, machine-learned models can allow for reliable detection of objects, path data, and/or classification labels, especially in scenarios similar to scenarios depicted in training data. However, the machine-learned object detection and/or classification models can be less reliable in instances having some degree of dissimilarity from the training data. For example, the machine-learned classification models may be unable to classify, as one example, a pedestrian in a costume (e.g., if the machine-learned classification models have not been trained on training data describing or sufficiently representative of pedestrians in costumes). That is, a pedestrian in a costume may be an unclassifiable object in some cases. As another example, the machine-learned object detection and/or classification models may be unable to detect and/or classify a type of object that is not present or frequently included in training data, such as an unusual circumstance, such as, for example, an animal running or a ball rolling in front of an autonomous vehicle or presence of an abnormal type of vehicle (e.g., a heavily damaged but still operable vehicle, a riding mower, construction equipment, etc.) nearby an autonomous vehicle. While training an autonomous vehicle system (e.g., a primary perception system) on a large and varied set of training examples is often desirable, the perception system can still encounter new and/or unfamiliar scenarios including unclassifiable objects during operation of an autonomous vehicle. Successfully navigating such unfamiliar scenarios can improve user safety and/or user experience. Additionally and/or alternatively, glare, dust/debris, or other obstructions, temporary or otherwise, may cause the machine-learned object detection and/or classification models to be unable to classify some unclassifiable objects that may normally be classifiable. However, it can still be desirable to navigate these unclassifiable, although normally classifiable, objects.

A secondary perception system according to aspects of the present disclosure can be configured to account for (e.g. identify) one or more unclassifiable objects (e.g., objects that were/are not classified and/or are unclassifiable by the primary perception system) based at least in part on the cluster(s) and the secondary path data. The unclassifiable and/or unclassified object(s) can include, for example, objects that are determined to exist in the sensor data by the secondary perception system. In some implementations, at least one of the unclassifiable and/or unclassified object(s) can be absent from the plurality of objects recognized by the primary perception system. For example, all of the clusters and/or secondary path data can be identified as unclassifiable and/or unclassified objects.

Additionally and/or alternatively, a secondary perception system can include a flow estimator system and a cluster fusion system. The flow estimator system and the cluster fusion system can be configured to identify the clusters and/or secondary path data as one or more unclassifiable and/or unclassified objects.

Example aspects of the present disclosure are directed to systems and methods employing a secondary perception system as a fallback perception system for the primary perception system to improve performance, safety, and/or reliability. The secondary perception system can operate in addition to the primary perception system and can serve to supplement the objects and/or paths provided by the primary perception systems to downstream components of an autonomous vehicle system. In this way, the structure of and/or benefits associated with the primary perception system can be maintained within the autonomous vehicle system. Additionally, the secondary perception system can allow for improved reliability of the autonomous vehicle system, especially in cases that are unfamiliar to the autonomous vehicle system. For instance, the secondary perception system can employ a more robust method for detecting objects than the primary perception system. In some implementations, the secondary perception system can achieve a different understanding (e.g., simpler understanding) of the objects than the primary perception system, but, in exchange, can detect and account for objects that may not be detected and accounted for by the primary perception system. Thus, the secondary perception system can act as a fallback perception system for the primary perception system.

The secondary perception system can cluster a set (e.g., a subset) of sensor data points of the sensor data to generate one or more clusters of the set of sensor data points. The set of sensor data points can include some or all of the sensor data points in the sensor data. According to example aspects of the present disclosure, the computing system can employ any suitable clustering algorithm and/or clustering model (e.g., a machine-learned clustering model) to cluster the set of sensor data points. Generally, the clustering algorithm and/or clustering model can define neighborhoods of sensor data points, and the neighborhood can be resolved to clusters. For example, in some implementations, the computing system can employ an unsupervised clustering model, such as, for example, an unsupervised machine-learned clustering model. Additionally and/or alternatively, in some implementations, the computing system can employ a connected component clustering model.

In some implementations, the computing system can cluster a set of sensor data points by a machine-learned clustering model that is configured to receive the set of sensor data points and, in response to receipt of the set of sensor data points, produce as output the cluster(s). For instance, in some implementations, the computing system can input the set of sensor data points into the machine-learned clustering model. The machine-learned clustering model can be configured to receive the set of sensor data points, and in response to receipt of the set of sensor data points by the machine-learned clustering model, produce, as output, one or more clusters of sensor data points in the sensor data. In some implementations, the machine-learned clustering model can be executed for several cycles, allowing the clusters to mature. For example, the maturing of the clusters can refer to allowing the clusters to form, stabilize, and/or converge. For instance, in some implementations, the machine-learned clustering model can be executed for a first number of cycles (e.g., five cycles) to mature. The machine-learned clustering model can be executed for a second number of cycles (e.g., three cycles) to re-mature in the event of a cluster becoming immature. For example, the data points of the cluster can drift apart and/or become less dense as the cluster of sensor data points traverses along a path (e.g., due to a vantage point of the autonomous vehicle with respect to the cluster and/or multiple objects being improperly clustered together). However, in some implementations, an immature cluster can nonetheless be propagated to other systems in the vehicle computing system. Thus, the machine-learned clustering model can be implemented to produce the clusters.

In some implementations, the secondary perception system can be configured to operate on all of the sensor data points in sensor data. Additionally and/or alternatively, in some implementations, it can be desirable for the secondary perception system to operate on only a subset of the sensor data points in the sensor data. For instance, the subset of the sensor data points can exclude classified sensor data points. For example, the classified sensor data points can be or include sensor data points that correspond with (e.g., comprise) objects classified by the primary perception system. In some instances, this can prevent redundant processing and/or object identification. As another example, the subset of the sensor data points can exclude nonviable data points. For example, nonviable sensor data points can be or include sensor data points that are outside of one or more regions of interest of the autonomous vehicle. As another example, nonviable sensor data points can be or include spurious sensor data points, such as sensor data points that are identified as spurious by the primary perception system and/or any additional systems configured to identify spurious sensor data points.

Thus, in some implementations, a subset of the sensor data points (e.g., fewer than all of the sensor data points) that are processed by the primary perception system can be clustered by the secondary perception system. For example, the sensor data can be filtered prior to being clustered to produce the subset of the sensor data points. Sensor data points that are outside of a region of interest of the autonomous vehicle system can be excluded. In some implementations, the set of sensor data points can be filtered by trackability heuristics that describe a set of desired criteria relating to characteristics of the set of sensor data points to be processed by the secondary perception system. For example, the set of sensor data points can be filtered to remove sensor data points that are in an insufficiently dense (e.g., point-dense) and/or an overly dense (e.g., point-dense) region. For instance, a density threshold and/or range can define a minimum and/or maximum density of sensor data points (e.g., point-density) in a region proximate an autonomous vehicle, and if a density associated with the sensor data in that region is outside of the density threshold and/or range (e.g., by having too few sensor data points in the region), some or all of the sensor data points in the region can be filtered out such that only sensor data points within the density threshold and/or range are included. For instance, in some implementations, a high density in a region can generally be indicative of an object in that region.

As another example, the subset of sensor data points selected for clustering can exclude sensor data points that are outside of a certain proximity of the autonomous vehicle (e.g., beyond a distance threshold). For instance, sensor data points that are beyond a distance threshold (e.g., too far) from an autonomous vehicle (e.g., a center of an autonomous vehicle and/or a particular element, such as a closest point on a body, of the autonomous vehicle) can be filtered out such that only sensor data points that are within the distance threshold are present in the filtered subset of sensor data points.

In some implementations, the subset of sensor data points for clustering can exclude sensor data points corresponding to one or more objects detected by the primary perception system. For example, sensor data points that are already classified by the primary perception system (e.g., known by the primary perception system to be spurious and/or belong to a classified object, such as a vehicle, bicycle, pedestrian, etc.) can be excluded. Thus, sensor data points corresponding to objects that are proximate to the autonomous vehicle and/or unclassifiable and/or unclassified can be clustered by the secondary perception system.

According to example aspects of the present disclosure, the secondary perception system can include a secondary tracker system (e.g., a fallback tracker system). The secondary tracker system can be configured to generate secondary path data that describes at least one respective tracked cluster path for the or more clusters with respect to the autonomous vehicle. For example, once the clusters are identified (e.g., by the clustering model), the secondary tracker system can determine a tracked cluster path associated with a cluster. The tracked cluster path can include one or more velocities for a cluster (e.g., a speed and/or a direction for an object), such as one or more current velocities and/or one or more prior velocities. The secondary path data can be based on the previous time-based locations of the cluster, such as, for example, as a ballistic path. The ballistic path can include a simple vector that describes an instantaneous velocity and/or heading of the object. For instance, in some implementations, the computing system (e.g., the secondary tracker system) can employ a greedy associator model. In some implementations, the greedy associator model can include a long short-term memory (LSTM) model scorer. In some implementations, the computing system (e.g., the primary tracker system and/or the secondary tracker system) can include an interacting multiple model (IMM).

The tracked cluster path can be determined over a time duration and/or interval, such as a current and/or prior duration and/or interval (e.g., a previous three seconds prior to the current time and location of the cluster). Thus, the secondary tracker system can determine secondary path data including respective tracked cluster paths of the clusters based on observed movement of the clusters.

Additionally, in some implementations, the secondary perception system can validate a tracked cluster path of an object identified by the secondary perception system by determining individual paths for sensor data points comprising the object and comparing such individual paths with the tracked cluster path. Validating and/or verifying the secondary path data can include detecting errors or inaccuracies of the secondary path data. For example, in some cases, the secondary path data can include one or more false positive conditions that can indicate movement of an object when the object is stationary (e.g., of a non-existent path). As one example, a changing perspective of a stationary object may result in perception of that the stationary object is moving in the secondary path data. This validation can help to identify and/or remove instances of erroneous and/or low confidence (e.g., "false positive") paths, velocities, and/or objects from the data output by the secondary perception system. This can, in some cases, enable a lower level object recognition algorithm and/or model (e.g., a clustering algorithm and/or model, such as an unsupervised model) to be employed for object recognition in the secondary perception system that, while robust, may also include a risk of providing invalid data, while avoiding the increased risk of invalid data (e.g., false positives) associated with (e.g., deriving from) the use of the lower level algorithm and/or model.

As one example, to validate the secondary path data, the computing system can employ a flow estimator system configured to determine one or more sensor data point paths associated with (e.g., describing a motion of) the sensor data points. For instance, the flow estimator system can be configured to determine a sensor data point path associated with (e.g., describing motion of) each of the sensor data points. A sensor data point path can describe a path associated with (e.g., describing motion of) a sensor data point (e.g., a LIDAR point). For example, the flow estimator system can employ an estimation network that can determine a path (e.g., a velocity) for each sensor data point based on the sensor data (e.g., sensor data over a previous time duration, such as about three seconds).

According to example aspects of the present disclosure, a cluster fusion system can validate a tracked cluster path for a cluster (e.g., in secondary path data) by determining a clustered sensor data point path (e.g., corresponding to a single path for the cluster) from the sensor data point paths and comparing the tracked cluster path to the clustered sensor data point path. Generally, the clustered sensor data point path is not necessarily identical to the tracked cluster path for a sensor data point cluster. For instance, in one example false positive condition, it can generally be observed that a tracked cluster path for a cluster may indicate a significant (e.g., greater than about zero) velocity, whereas a velocity defined by a clustered sensor data point path for the cluster may be about zero, such as less than a threshold, such as less than a threshold of about zero. As one example of condition that can cause a false positive, the tracked cluster path could represent a forward velocity of a cluster object relative to the autonomous vehicle, yet the velocity of the clustered sensor data point path can indicate that the cluster is stationary. Conversely, the tracked cluster path can indicate that the object is stationary while the clustered sensor data point path can indicate that the cluster is moving. Such discrepancies can be caused by the tracked cluster path being determined by a different method than the clustered sensor data point path.

On the other hand, in cases of objects corresponding to clusters that are moving (e.g., not a false positive condition), it can generally be observed that the clustered sensor data point path and the tracked cluster path can be within a margin of each other. In other words, a difference (e.g., a difference in a magnitude of velocities) between the clustered sensor data point path and the tracked cluster path for a cluster can be less than a threshold, such as about zero.

More particularly, as an example of the cluster fusion system validating a path from the fallback tracker, the cluster fusion system can determine a difference between a clustered sensor data point path and a tracked cluster path for the cluster. In some implementations, the cluster fusion system can validate a tracked cluster path by determining that the difference between a clustered sensor data point path and the tracked cluster path for a cluster is less than a threshold and, in response to determining that the difference is less than the threshold, the cluster fusion system can identify the cluster as one of the unclassifiable and/or unclassified object(s). For instance, this can indicate a general agreement between the tracked cluster path and the clustered sensor data point path, which can typically be indicative of the presence of a real moving object.

A difference between a clustered sensor data point path and a tracked cluster path for a cluster can be any suitable result of a difference operation between the clustered sensor data point path and the tracked cluster path. As one example, a difference can be and/or include a magnitude component. For example, the difference can be and/or include a magnitude difference between a velocity magnitude (e.g., speed) of the clustered sensor data point path and a velocity magnitude of the tracked cluster path. As another example, a difference can include an angular component. For example, the difference can be and/or include an angular difference between a velocity angle (e.g., direction) of the clustered sensor data point path and a velocity angle of the tracked cluster path. As another example, a difference can be a vector difference between the clustered sensor data point path and the tracked cluster path (e.g., a result of a vector subtraction operation). In some implementations, the difference can be associated with (e.g. defined at and/or for) a particular point in time. For example, the difference can be defined between velocities of the clustered sensor data point path and the tracked cluster path at the same point in time.

As another example of validating a tracked cluster path, the cluster fusion system can determine that a clustered sensor data point path for a cluster has a magnitude (e.g., a vector magnitude) greater than a threshold. In response to determining that the clustered sensor data point path for the cluster has a magnitude greater than the threshold, the cluster fusion system can identify the cluster as one of the unclassifiable and/or unclassified object(s). For instance, in some example implementations, clusters having a clustered sensor data point path having a significant magnitude (e.g., greater than zero) can generally correspond to real moving objects. In some implementations, the threshold can be and/or include a scalar threshold. For example, the threshold can be and/or include a scalar threshold such that a scalar value of the difference (e.g., a difference between magnitudes and/or angles) is compared to the scalar threshold.

As one example of determining a clustered sensor data point path, the cluster fusion system can aggregate sensor data point paths for some or all data points defining a single cluster to determine a clustered sensor data point path for that cluster. As used herein, aggregating sensor data point paths can include performing any suitable combinatorial operation on the sensor data point paths to determine a composite and/or representative value of the sensor data point paths. For example, aggregating sensor data point paths can include summing the sensor data point paths. As another example, aggregating sensor data point paths can include generating a weighted sum of the sensor data point paths. Additionally and/or alternatively, aggregating sensor data point paths can include removing one or more outliers from the data point paths.

The computing system can fuse (e.g., combine and/or reconcile) secondary perception data describing objects (e.g., actors) and/or paths from the secondary perception system with primary perception data describing the classified objects from the primary perception system to create fused perception data that can be indicative of a better understanding of an environment of the autonomous vehicle than the primary perception data. For example, in some implementations, all of the objects and/or paths from the primary perception system and/or the secondary perception system can be fused into fused perception data. As another example, in some implementations, the fusion step can include deduplicating objects and/or that are recognized by both the primary perception system and the secondary perception system. The fused perception data can structurally resemble the primary perception data (e.g., such that the fused perception data may be used in place of the primary perception data) in that the fused perception data can include data describing objects and/or tracked motion associated with the objects. Additionally, the fused perception data can include classification labels associated with the objects.

According to example aspects of the present disclosure, a computing system can include a perception fusion system. In some implementations, after the secondary perception system has identified one or more unclassifiable and/or unclassified objects (and/or associated paths), a perception fusion system can determine fused perception data that describes one or more fused objects. The fused object(s) can have one or more associated fused paths. The perception fusion system can effectively "fuse" the sets of objects produced by the primary perception system and the secondary perception system to produce a fused set of objects and/or paths. For instance, in some implementations, the perception fusion system can include each of the objects and/or paths from the primary perception system and/or the secondary perception system in the fused set. As another example, the fusion system can deduplicate objects and/or paths present in data from both the primary perception system and the secondary perception system when producing the fused set. The fused set of objects and paths can then be used (e.g., at a downstream system such as a prediction system and/or a planning system) to navigate an autonomous vehicle.

In some implementations, the secondary perception system and/or the perception fusion can include and/or assign an effective class representing the objects from the secondary perception system. For instance, although the objects from the secondary perception system can generally be unclassifiable by the primary perception system, in some implementations, an effective class can be assigned to represent the objects from the secondary perception system. The assigned class can generally be used in downstream processing of the objects. For instance, in some implementations, a conservative class (e.g., a pedestrian class) having generally conservative aspects (e.g., a high avoidance priority, low maximum speed, and/or other suitable conservative aspects) can be assigned to the objects from the secondary perception system. Thus, even if characteristics of the objects are unknown, the effective class can allow the perception system and/or downstream systems to handle the objects from the secondary perception system after fusion. Furthermore, in cases where a conservative class is assigned, downstream components can plan based on the objects with a high degree of caution, which can especially be beneficial in cases where the objects from the secondary perception system correspond to unusual and/or abnormal objects.

Thus, the secondary perception system can detect and/or generate paths for objects (e.g., actors), that could otherwise by overlooked by the primary perception system as unclassifiable and/or unclassified and/or incorrectly classified (e.g., a ball bouncing in front of an autonomous vehicle, an unusually-shaped vehicle, a pedestrian in a costume, etc.). Despite being unrecognizable to the primary perception system, it can be desirable and/or necessary to account for such objects when generating a motion plan for an autonomous vehicle with respect to these objects, which can be achieved by including the objects and/or paths from the secondary perception system. Additionally, objects that are not properly accounted for by the primary perception system (e.g., due to being partially obscured, highly reflective, poorly lit, etc.) can nonetheless be satisfactorily accounted for by the secondary perception system.

Example aspects of the present disclosure can provide a number of technical effects and benefits, including improvements to computing systems. For example, aspects of the present disclosure can provide improved safety and reliability in detecting objects proximate the autonomous vehicle. As described herein, a primary perception system can perceive, based on sensor data, one or more objects and paths associated with (e.g., describing motion of) those objects in addition to classifying the objects into a set of classes and/or categories best representing a type of the objects. A secondary perception system can perceive, based on the sensor data, moving clusters within the sensor data, which may not be classifiable by the primary perception system and/or thus be overlooked by the primary perception system. For instance, a secondary perception system can identify one or more unclassifiable and/or unclassified objects based at least in part on clustered sensor data points, which can define objects that are unclassifiable and/or unclassified by the primary perception system.

For example, common objects can be perceived and classified by the primary perception system and subsequently used for motion planning of an autonomous vehicle with a high-level understanding of the objects, which can allow for advanced planning functionality. For example, if an object is classified (e.g., as a type of vehicle, pedestrian, etc.), it can be possible to estimate a maximum speed and/or acceleration of the object, estimate an approximate size of unknown dimensions of the object, etc., in addition to several other known advantages. In addition, the secondary perception system can recognize clusters corresponding to objects which are not recognized and/or classified by the primary perception system, but must nonetheless be accounted for in motion planning of an autonomous vehicle. For instance, a secondary perception system can identify one or more unclassifiable and/or unclassified objects based at least in part on clustered sensor data points, which can define objects that are unclassifiable and/or unclassified by the primary perception system. Thus, the tandem operation of the primary perception system and the secondary perception system can more reliably detect nearby objects and/or navigate an environment of the autonomous vehicle.

Various means can be configured to perform the methods and processes described herein. For example, a computing system can include sensor data obtaining unit(s), map data obtaining unit(s), primary perception unit(s), secondary perception unit(s), perception fusion unit(s), path/behavior forecasting unit(s), motion planning unit(s), vehicle controlling unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain sensor data including one or more sensor data points from one or more sensors that generate sensor data relative to an autonomous vehicle. In some implementations, the means can be configured to obtain sensor data associated with (e.g., describing) the autonomous vehicle's surrounding environment as well as the position and movement of the autonomous vehicle. In some implementations, the means can be configured to obtain LIDAR data (e.g., a three-dimensional point cloud) obtained from a LIDAR system. In some implementations, the means can be configured to obtain image data obtained from one or more cameras. In some implementations, the means can be configured to obtain a birds-eye view representation of data obtained relative to the autonomous vehicle. In some implementations, the means can be configured to obtain sensor data represented as a multi-dimensional tensor having a height dimension and a time dimension stacked into a channel dimension associated with (e.g., defining) the multi-dimensional tensor. A sensor data obtaining unit is one example of a means for obtaining the sensor data as described herein.

The means can be configured to access or otherwise obtain map data associated with (e.g., describing) a surrounding geographic environment of the autonomous vehicle. More particularly, in some implementations, the means can be configured to access or otherwise obtain map data that provides information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system in processing, analyzing, and perceiving its surrounding environment and its relationship thereto. In some implementations, the means can be configured to access or otherwise obtain map data that is provided in a birds-eye view representation, such as generated by rasterization or other suitable processing format. A map data obtaining unit is one example of a means for obtaining such map data as described herein.

The means can be configured to access or otherwise obtain primary perception data. For instance, the means can be configured to receive sensor data including a plurality of sensor data points as input. Furthermore, in response to receipt of the sensor data as input, the means can be configured to generate primary perception data representing a plurality of classifiable objects and a plurality of paths representing tracked motion of the plurality of classifiable objects. In some implementations, each classifiable object can be classified by the means as a predefined class of a plurality of predefined classes of objects. A primary perception unit is one example of a means for obtaining such primary perception data as described herein.

The means can be configured to access or otherwise obtain secondary perception data. For instance, the means can be configured to receive sensor data including a plurality of sensor data points as input. Furthermore, in response to receipt of the sensor data as input, the means can be configured to generate secondary perception data descriptive of one or more unclassified objects. For instance, the means can be configured to cluster a subset of the plurality of sensor data points of the sensor data to generate one or more sensor data point clusters representing unclassifiable object(s) that are not classifiable by the means as any one of the plurality of predefined classes of objects. Additionally and/or alternatively, the means can be configured to generate secondary path data representing tracked motion of the unclassifiable object(s). A secondary perception unit is one example of a means for accessing or otherwise obtaining such secondary perception data as described herein.

The means can be configured to determine fused perception data representing a tracked motion of a plurality of classifiable objects and a tracked motion of one or more unclassifiable objects. A perception fusion unit is one example of a means for obtaining such fused perception data as described herein.

The means can be configured to generate motion forecast data that describes or predicts the path/behavior of one or more actors with respect to the autonomous vehicle. A path/behavior forecasting unit is one example of a means for generating motion forecast data as described herein.

The means can be configured to determine a motion plan for the autonomous vehicle based at least in part on the motion forecast data. The means can be configured to determine a motion plan for the autonomous vehicle that best navigates the autonomous vehicle along a determined travel route relative to the objects at such locations. In some implementations, the means can be configured to determine a cost function for each of one or more candidate motion plans for the autonomous vehicle based at least in part on the current locations and/or predicted future locations and/or moving paths of the objects. A motion planning unit is one example of a means for determining a motion plan for the autonomous vehicle.

The means can be configured to control one or more vehicle controls (e.g., actuators or other devices that control gas flow, steering, braking, etc.) to execute the selected motion plan. A vehicle controlling unit is one example of a means for controlling motion of the autonomous vehicle to execute the motion plan.

With reference now to the FIGS., example implementations of the present disclosure will be discussed in further detail.

FIG. 1 illustrates an example vehicle computing system 100 according to example implementations of the present disclosure. The vehicle computing system 100 can be associated with a vehicle 105. The vehicle computing system 100 can be located onboard (e.g., included on and/or within) the vehicle 105.

The vehicle 105 incorporating the vehicle computing system 100 can be various types of vehicles. The vehicle 105 can be an autonomous vehicle. For instance, the vehicle 105 can be a ground-based autonomous vehicle such as an autonomous car, autonomous truck, autonomous bus, lightweight electric vehicle (e.g., scooter, bicycle, etc.), and/or other types of ground vehicles. The vehicle 105 can be an air-based autonomous vehicle (e.g., airplane, helicopter, or other aircraft) or other types of vehicles (e.g., watercraft, etc.). The vehicle 105 can drive, navigate, operate, etc. with minimal and/or no interaction from a human operator 106 (e.g., driver). An operator 106 (also referred to as a vehicle operator) can be included in the vehicle 105 and/or remote from the vehicle 105. In some implementations, the vehicle 105 can be a non-autonomous vehicle.

In some implementations, the vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a vehicle operator present in the vehicle 105 and/or remote from the vehicle 105). The vehicle 105 can operate in a semi-autonomous operating mode in which the vehicle 105 can operate with some input from a vehicle operator present in the vehicle 105 (and/or a human operator that is remote from the vehicle 105). The vehicle 105 can enter into a manual operating mode in which the vehicle 105 is fully controllable by a vehicle operator 106 (e.g., human driver, pilot, etc.) and can be prohibited and/or disabled (e.g., temporary, permanently, etc.) from performing autonomous navigation (e.g., autonomous driving). In some implementations, the vehicle 105 can implement vehicle operating assistance technology (e.g., collision mitigation system, power assist steering, etc.) while in the manual operating mode to help assist the vehicle operator of the vehicle 105. For example, a collision mitigation system can utilize a predicted intention of objects within the vehicle's 105 surrounding environment to assist an operator 106 in avoiding collisions and/or delays even when in manual mode.

The operating modes of the vehicle 105 can be stored in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 100 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. For example, in some implementations, the remote computing system can be an operations computing system 195, as disclosed herein. By way of example, such data communicated to a vehicle 105 by the operations computing system 195 can instruct the vehicle 105 to enter into the fully autonomous operating mode. In some implementations, the operating mode of the vehicle 105 can be set onboard and/or near the vehicle 105. For example, the vehicle computing system 100 can automatically determine when and where the vehicle 105 is to enter, change, maintain, etc. a particular operating mode (e.g., without user input). Additionally, or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The vehicle computing system 100 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for determining object intentions based on physical attributes.

The vehicle 105 can include a communications system 120 configured to allow the vehicle computing system 100 (and its computing device(s)) to communicate with other computing devices. The vehicle computing system 100 can use the communications system 120 to communicate with one or more computing device(s) that are remote from the vehicle 105 over one or more networks (e.g., via one or more wireless signal connections). In some implementations, the communications system 120 can allow communication among one or more of the system(s) on-board the vehicle 105. The communications system 120 can include any suitable components for interfacing with one or more network(s), including, for example, transmitters, receivers, ports, controllers, antennas, and/or other suitable components that can help facilitate communication.

As shown in FIG. 1, the vehicle 105 can include one or more vehicle sensors 125, an autonomy computing system 130, one or more vehicle control systems 135, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The vehicle sensor(s) 125 can be configured to acquire the sensor data 140. This can include sensor data associated with the surrounding environment of the vehicle 105. For instance, the sensor data 140 can include image and/or other data within a field of view of one or more of the vehicle sensor(s) 125. The vehicle sensor(s) 125 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 140 can include image data, radar data, LIDAR data, and/or other data acquired by the vehicle sensor(s) 125. The vehicle 105 can also include other sensors configured to acquire data associated with the vehicle 105. For example, the vehicle 105 can include inertial measurement unit(s), wheel odometry devices, and/or other sensors.

In some implementations, the sensor data 140 can be indicative of one or more objects within the surrounding environment of the vehicle 105. The object(s) can include, for example, vehicles, pedestrians, bicycles, and/or other objects. The object(s) can be located in front of, to the rear of, to the side of the vehicle 105, etc. The sensor data 140 can be indicative of locations associated with the object(s) within the surrounding environment of the vehicle 105 at one or more times. The vehicle sensor(s) 125 can provide the sensor data 140 to the autonomy computing system 130.

In addition to the sensor data 140, the autonomy computing system 130 can retrieve or otherwise obtain map data 145. The map data 145 can provide information about the surrounding environment of the vehicle 105. In some implementations, the vehicle 105 can obtain detailed map data that provides information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other map data that provides information that assists the vehicle 105 in comprehending and perceiving its surrounding environment and its relationship thereto. In some implementations, the vehicle computing system 100 can determine a vehicle route for the vehicle 105 based at least in part on the map data 145.

The vehicle 105 can include a positioning system 150. The positioning system 150 can determine a current position of the vehicle 105. The positioning system 150 can be any device or circuitry for analyzing the position of the vehicle 105. For example, the positioning system 150 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 105 can be used by various systems of the vehicle computing system 100 and/or provided to a remote computing system. For example, the map data 145 can provide the vehicle 105 relative positions of the elements of a surrounding environment of the vehicle 105. The vehicle 105 can identify its position within the surrounding environment (e.g., across six axes, etc.) based at least in part on the map data 145. For example, the vehicle computing system 100 can process the sensor data 140 (e.g., LIDAR data, camera data, etc.) to match it to a map of the surrounding environment to get an understanding of the vehicle's position within that environment.

The autonomy computing system 130 can include a perception system 155, a prediction system 160, a motion planning system 165, and/or other systems that cooperate to perceive the surrounding environment of the vehicle 105 and determine a motion plan for controlling the motion of the vehicle 105 accordingly. For example, the autonomy computing system 130 can obtain the sensor data 140 from the vehicle sensor(s) 125, process the sensor data 140 (and/or other data) to perceive its surrounding environment, predict the motion of objects within the surrounding environment, and generate an appropriate motion plan through such surrounding environment. The autonomy computing system 130 can communicate with the one or more vehicle control systems 135 to operate the vehicle 105 according to the motion plan.

The vehicle computing system 100 (e.g., the autonomy computing system 130) can identify one or more objects that are proximate to the vehicle 105 based at least in part on the sensor data 140 and/or the map data 145. For example, the vehicle computing system 100 (e.g., the perception system 155) can process the sensor data 140, the map data 145, etc. to obtain perception data 170 (e.g., fused perception data). The vehicle computing system 100 can generate perception data 170 that is indicative of one or more states (e.g., current and/or past state(s)) of a plurality of objects that are within a surrounding environment of the vehicle 105. For example, the perception data 170 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class), the uncertainties associated therewith, and/or other state information. The perception system 155 can provide the perception data 170 to the prediction system 160, the motion planning system 165, the perception system 155, and/or other system(s). Example perception systems according to example aspects of the present disclosure are discussed more particularly with respect to FIGS. 2A-2B.

The prediction system 160 can be configured to predict a motion of the object(s) within the surrounding environment of the vehicle 105. For instance, the prediction system 160 can generate prediction data 175 associated with such object(s). The prediction data 175 can be indicative of one or more predicted future locations of each respective object. For example, the prediction system 160 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175 can be indicative of the speed and/or acceleration at which the respective object is predicted to travel along its associated predicted motion trajectory. In some implementations, the prediction data 175 can include a predicted object intention (e.g., a right turn) based on physical attributes of the object. The prediction system 160 can output the prediction data 175 (e.g., indicative of one or more of the predicted motion trajectories) to the motion planning system 165. In some implementations, the functions the perception system 155 and the prediction system 160 can be included within the same system and/or share one or more computing resources.

The vehicle computing system 100 (e.g., the motion planning system 165) can determine a motion plan 180 for the vehicle 105 based at least in part on the perception data 170, the prediction data 175, and/or other data. A motion plan 180 can include vehicle actions (e.g., planned vehicle trajectories, speed(s), acceleration(s), intention, other actions, etc.) with respect to one or more of the objects within the surrounding environment of the vehicle 105 as well as the objects' predicted movements. For instance, the motion planning system 165 can implement an optimization algorithm, model, etc. that considers cost data associated with a vehicle action as well as other objective functions (e.g., cost functions based on speed limits, traffic lights, etc.), if any, to determine optimized variables that make up the motion plan 180. The motion planning system 165 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the motion planning system 165 can evaluate one or more of the predicted motion trajectories of one or more objects during its cost data analysis as it determines an optimized vehicle trajectory through the surrounding environment. The motion planning system 165 can generate cost data associated with such trajectories. In some implementations, one or more of the predicted motion trajectories may not ultimately change the motion of the vehicle 105 (e.g., due to an overriding factor). In some implementations, the motion plan 180 may define the vehicle's motion such that the vehicle 105 avoids the object(s), reduces speed to give more leeway to one or more of the object(s), proceeds cautiously, performs a stopping action, etc.

The motion planning system 165 can be configured to continuously update the vehicle's motion plan 180 and a corresponding planned vehicle motion trajectory. For example, in some implementations, the motion planning system 165 can generate new motion plan(s) for the vehicle 105 (e.g., multiple times per second). Each new motion plan can describe a motion of the vehicle 105 over the next planning period (e.g., next several seconds). Moreover, a new motion plan may include a new planned vehicle motion trajectory. Thus, in some implementations, the motion planning system 165 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 100 can cause the vehicle 105 to initiate a motion control in accordance with at least a portion of the motion plan 180. A motion control can be an operation, action, etc. that is associated with controlling the motion of the vehicle. For instance, the motion plan 180 can be provided to the vehicle control system(s) 135 of the vehicle 105. The vehicle control system(s) 135 can be associated with a vehicle controller (e.g., including a vehicle interface) that is configured to implement the motion plan 180. The vehicle controller can, for example, translate the motion plan into instructions for the appropriate vehicle control component (e.g., acceleration control, brake control, steering control, etc.). By way of example, the vehicle controller can translate a determined motion plan 180 into instructions to adjust the steering of the vehicle 105 X degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 180 (e.g., by sending control signal(s), making the translated plan available, etc.). This can allow the vehicle 105 to autonomously travel within the vehicle's surrounding environment.

As shown in FIG. 1, the vehicle 105 can include an HMI (Human Machine Interface) 190 that can output data and accept input from the operator 106 of the vehicle 105. For instance, the HMI 190 can include one or more output devices (e.g., speakers, display devices, tactile devices, etc.) such that, in some implementations, the HMI 190 can provide one or more informational prompts to the operator 106 of the vehicle 105. For example, the HMI 190 can be configured to provide prediction data 170 such as a predicted object intention to one or more vehicle operator(s) 106. Additionally, or alternatively, the HMI 190 can include one or more input devices (e.g., buttons, microphones, cameras, etc.) to accept vehicle operator 106 input. In this manner, the HMI 190 can communicate with the vehicle operator 106.

Figure 2A:
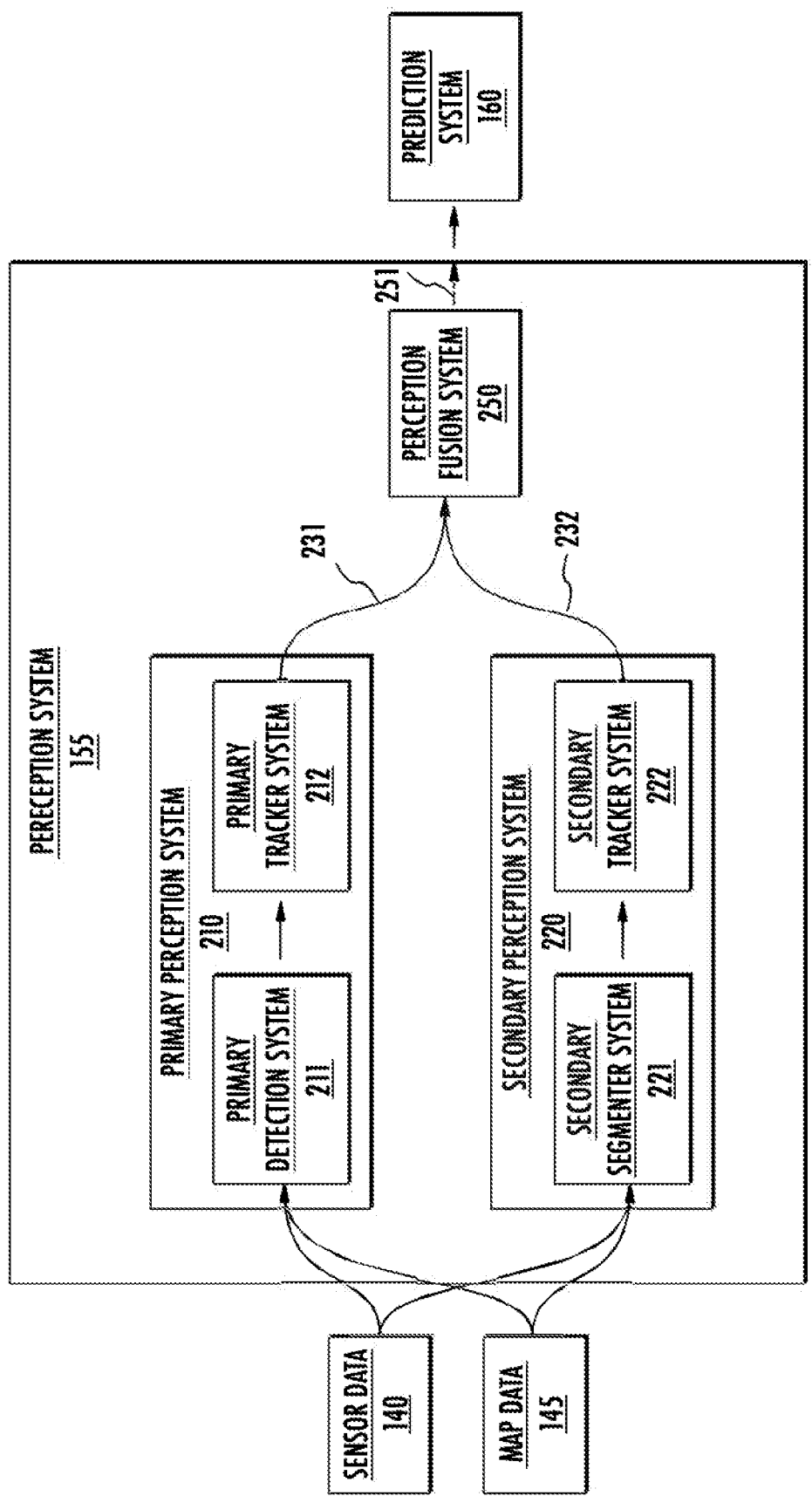
FIG. 2A depicts an example data flow diagram of an example perception system according to example implementations of the present disclosure.

FIG. 2A depicts an example perception system 155 including a primary perception system 210 and a secondary perception system 220 according to example aspects of the present disclosure. According to example aspects of the present disclosure, the primary perception system 210 can generate primary perception data 231 using a primary detection system 211 and primary tracker system 212. For instance, the primary detection system 211 can be configured to identify a plurality of objects (e.g., classifiable objects) and/or classify a plurality of objects based at least in part on the sensor data 140 and/or map data 145. Additionally and/or alternatively, the primary tracker system 212 can be configured to identify a plurality of paths (e.g., tracked paths) representing motion (e.g., tracked motion) of the plurality of objects.

The primary perception data 231 can be descriptive of a plurality of objects. For instance, the plurality of objects described by the primary perception data 231 can be described at least in part by the sensor data 140. Additionally and/or alternatively, the plurality of objects described by the primary perception data 231 can be described at least in part by map data 145. In other words, the sensor data 140 and/or map data can depict the plurality of objects (e.g., by capturing and/or representing the objects in data). The primary perception data 231 can serve to identify and/or otherwise describe the objects depicted by the sensor data 140 and/or map data 145 in a computer-readable and/or operable manner.

Additionally and/or alternatively, the primary perception data 231 can be descriptive of path data that describes and/or identifies a plurality of paths with respect to autonomous vehicle 105 and respectively associated with (e.g., describing tracked motion of) the plurality of objects. A path can describe or illustrate, by any suitable means, how an object and/or actor has been moving (e.g., over a previous time interval), is currently moving (e.g., at a current time instance), and/or is projected to move (e.g., over a future time interval, such as by a heading (e.g., a magnitude and/or a direction)). For instance, a path can define and/or include one or more velocities for an object (e.g., a speed and/or a direction for an object), such as one or more current velocities and/or one or more prior velocities. As one example, a path can depict motion (e.g., tracked motion) of an object by a time series of prior positions and/or velocities with respect to autonomous vehicle 105 and/or absolutely (e.g., geospatially).

Additionally and/or alternatively, the primary perception data 231 can be descriptive of at least one classification label respectively associated with (e.g., describing motion of) at least one of a plurality of objects (e.g., classifiable objects) described by the primary perception data 231. For instance, at least one classification label can be an identifier of an object as belonging to a class (e.g., a predefined class) of similar objects. Class and/or category examples can include entity type (e.g., motor vehicle, nonpowered vehicle, pedestrian, etc.) and/or vehicle type (e.g., bicycle, car, truck, bus, etc.). Thus, the primary perception can classify objects that are identifiable as belonging to particular predefined class.

In some implementations, the primary perception system 210 can generate the primary perception data 231 using class-based assumptions about the objects. For example, the primary perception data 231 can be generated by identifying and/or classifying the objects with respect to the predefined classes (e.g., at primary detection system 211) and generating the primary perception data 231 (e.g., paths) based at least in part on characteristics of those classes (e.g., at primary tracker system 212). Thus, the primary perception system 210 can use information describing respective classes of the objects to determine paths of the objects.

In some implementations, the classes can be learned through training of the primary perception system 210 on a corpus of training data. For instance, the primary perception system 210 can employ one or more machine-learned object detection and/or classification models configured to receive at least the sensor data 140 as input and, in response to receipt of the sensor data 140, provide an output including, for example, primary perception data 231 including identification of at least one of objects, path data, or classification labels. In some implementations, training data can include sets of the sensor data 140 labeled with object data (e.g., a bounding box surrounding an object, list of sensor data points comprising the object, etc.), path data, and/or classification label data (e.g., an established class of one or more objects in the training data). In some implementations, the classes can be selected based on common objects encountered in a vehicle context, such as an autonomous vehicle context of autonomous vehicle 105. For example, a plurality of predefined classes can include, but is not limited to, a pedestrian class, a bicycle class, a vehicle class, a train class, a spurious class, an airplane class, a bus class, a semitruck class, an emergency vehicle class, or any other suitable classes.

Additionally and/or alternatively, one or more sensor data points in the sensor data 140 can be classified as spurious (e.g., by the primary perception system 210). For instance, spurious sensor data points can be sensor data points that are unknown, uncertain, and/or otherwise unresolvable at the time of observation. As one example, spurious sensor data points can be sensor data points whose values are at least partially attributable to circumstances such as, but not limited to, rain, dust, snow, particulate matter, reflections, glare, obstructions (e.g., smudges on a camera and/or LIDAR sensor), and/or other suitable circumstance, and/or combination thereof. In some cases, spurious sensor data points can be resolved as an observation frame advances over time. In some implementations, one or more objects (e.g., a spurious object class) can be assigned to spurious sensor data points. In some implementations, nonviable sensor data points can include some or all of the spurious sensor data points. Thus, some or all of the spurious sensor data points can be excluded from clustering by the secondary perception system 220, as discussed in further detail below.

Additionally and/or alternatively, perception system 155 can include the secondary perception system 220. The secondary perception system 220 can be configured to account for (e.g. identify) one or more unclassifiable and/or unclassified objects (e.g., objects that were/are not classified and/or are unclassifiable by the primary perception system). For example, the secondary perception system 220 can generate secondary perception data 232 that is descriptive of the unclassifiable and/or unclassified object(s). The unclassifiable and/or unclassified object(s) can include, for example, objects that are determined to exist in the sensor data by the secondary perception system 220. For example, secondary perception system can include at least secondary segmenter system 221 and secondary tracker system 222. In some implementations, at least one of the unclassifiable and/or unclassified object(s) can be absent from the plurality of objects recognized by the primary perception system 210. An example configuration of the secondary perception system 220 is discussed more particularly below with reference to FIG. 2B.

Additionally and/or alternatively, perception system 155 can include perception fusion system 250. In some implementations, after the secondary perception system 220 has identified one or more unclassifiable and/or unclassified objects (and/or associated paths), perception fusion system 250 can determine fused perception data 251 that describes one or more fused objects. The fused object(s) can have one or more associated fused paths. Perception fusion system 250 can effectively "fuse" the sets of objects produced by the primary perception system 210 and the secondary perception system 220 to produce a fused set 251 of objects and/or paths. For instance, in some implementations, perception fusion system 250 can include each of the objects and/or paths from the primary perception system 210 and/or the secondary perception system 220 in the fused set. As another example, the perception fusion system 250 can deduplicate objects and/or paths present in the primary perception data 231 and/or the secondary perception data 232 when producing the fused set 251. The fused set 251 of objects and paths can then be used (e.g., at a downstream system such as a prediction system and/or a planning system) to navigate an autonomous vehicle.

In some implementations, the secondary perception system 220 and/or the perception fusion can include and/or assign an effective class representing the objects from the secondary perception system 220. For instance, although the objects from the secondary perception system 220 can generally be unclassifiable by the primary perception system 210, in some implementations, an effective class can be assigned to represent the objects from the secondary perception system 220. The assigned class can generally be used in downstream processing of the objects. For instance, in some implementations, a conservative class (e.g., a pedestrian class) having generally conservative aspects (e.g., a high avoidance priority, low maximum speed, and/or other suitable conservative aspects) can be assigned to the objects from the secondary perception system 220. Thus, even if characteristics of the objects are unknown, the effective class can allow perception system 155 and/or downstream systems (e.g., prediction system 160 and/or motion planning system 165 (FIG. 1)) to handle the objects from the secondary perception system 220 after fusion. Furthermore, in cases where a conservative class is assigned, downstream components can plan based on the objects with a high degree of caution, which can especially be beneficial in cases where the objects from the secondary perception system 220 correspond to unusual and/or abnormal objects.

Thus, the secondary perception system 220 can detect and/or generate paths for objects (e.g., actors), that could otherwise by overlooked by the primary perception system 210 as unclassifiable and/or unclassified or incorrectly classified (e.g., a ball bouncing in front of an autonomous vehicle, an unusually-shaped vehicle, a pedestrian in a costume, etc.). Despite being unrecognizable to the primary perception system 210, it can be desirable and/or necessary to account for such objects when generating the motion plan 180 (FIG. 1) for the autonomous vehicle 105 (FIG. 1) with respect to these objects, which can be achieved by including the objects and/or paths from the secondary perception system 220.

Figure 2B:
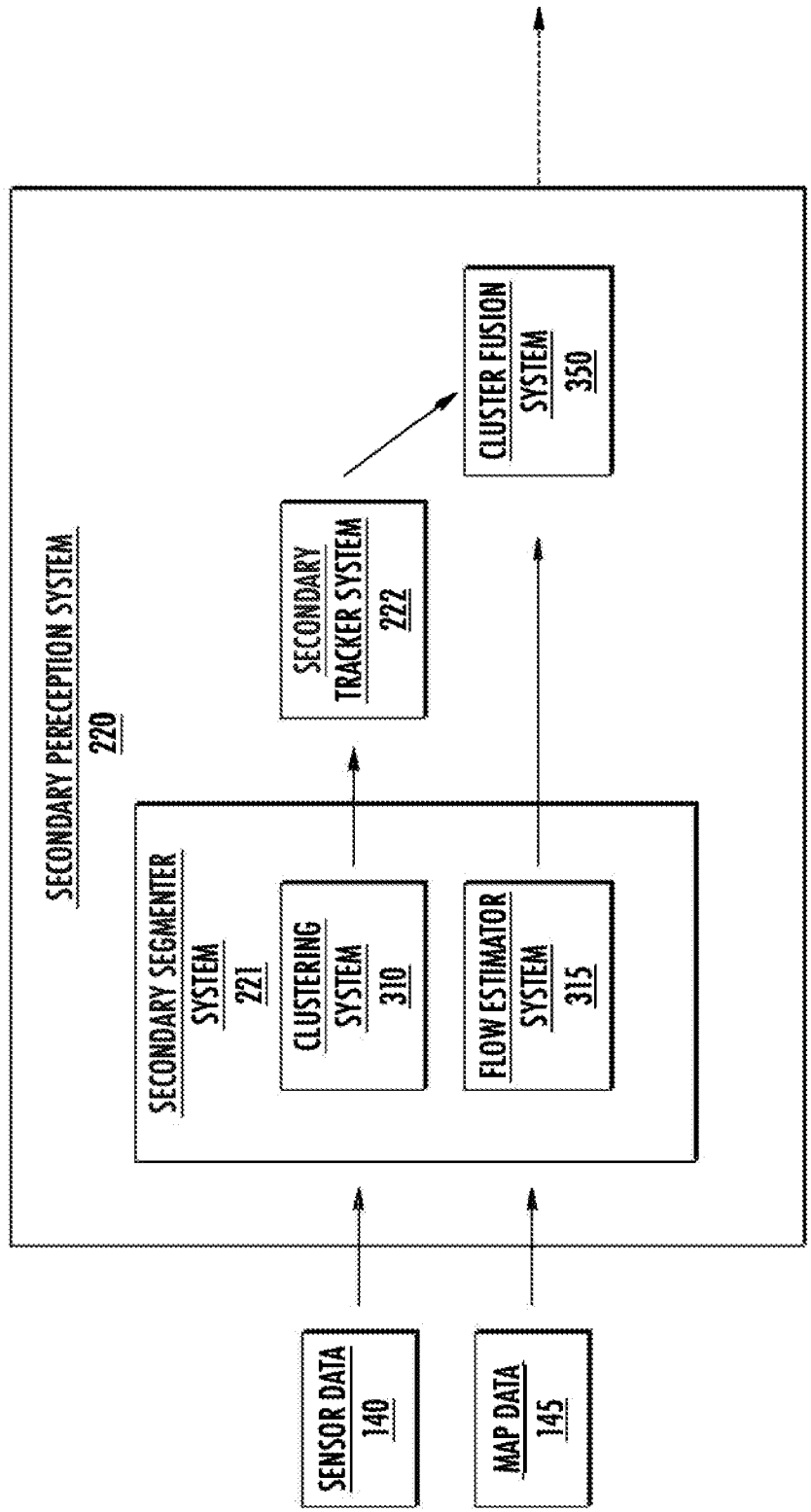
FIG. 2B depicts an example data flow diagram of an example fallback perception system according to example implementations of the present disclosure.

FIG. 2B depicts an example the secondary perception system 220 according to example aspects of the present disclosure. The secondary perception system 220 can operate in addition to the primary perception system 210 and can serve to supplement the objects and/or paths provided by the primary perception system 210 to downstream components of an autonomous vehicle system. In this way, the structure of and/or benefits associated with the primary perception system 210 can be maintained within the vehicle computing system 100. Additionally, the secondary perception system 220 can allow for improved reliability of the autonomous vehicle system, especially in cases that are unfamiliar to the autonomous vehicle system. For instance, the secondary perception system 220 can employ a more robust method for detecting objects than the primary perception system 210. In some implementations, the secondary perception system 220 can achieve a different understanding (e.g., simpler understanding) of the objects than the primary perception system 210, but, in exchange, can detect and account for objects that may not be detected and accounted for by the primary perception system 210. Thus, the secondary perception system 220 can act as a fallback perception system for the primary perception system 210.

The secondary perception system 220 can cluster a set (e.g., a subset) of sensor data points of the sensor data 140 to generate one or more clusters of the set of sensor data points. For instance, the secondary perception system 220 can include the secondary segmenter system 221. Secondary segmenter system 221 can include clustering system 310 that can be configured to cluster a set of sensor data points to generate one or more clusters. The set of sensor data points can include some or all of sensor data points in the sensor data 140. According to example aspects of the present disclosure, the clustering system 310 can employ any suitable clustering algorithm and/or clustering model (e.g., a machine-learned clustering model) to cluster the set of sensor data points. Generally, the clustering algorithm and/or clustering model can define neighborhoods of sensor data points, and the neighborhood can be resolved to clusters. For instance, a neighborhood of data can refer to data that is spatially proximate (e.g., within a threshold distance, such as 3 m) in a vector space (e.g., a 3D data space). For example, in some implementations, clustering system 310 can employ an unsupervised clustering model, such as, for example, an unsupervised machine-learned clustering model. Additionally and/or alternatively, in some implementations, clustering system 310 can employ a connected component clustering model.

In some implementations, clustering system 310 can cluster a set of sensor data points by a machine-learned clustering model that is configured to receive the set of sensor data points and, in response to receipt of the set of sensor data points, produce as output the cluster(s). For instance, in some implementations, the computing system can input the set of sensor data points into the machine-learned clustering model. The machine-learned clustering model can be configured to receive the set of sensor data points, and in response to receipt of the set of sensor data points by the machine-learned clustering model, produce, as output, one or more clusters of sensor data points in the sensor data 140. In some implementations, the machine-learned clustering model can be executed for several cycles, allowing the clusters to mature. For example, the maturing of the clusters can refer to allowing the clusters to form, stabilize, and/or converge. For instance, in some implementations, the machine-learned clustering model can be executed for a first number of cycles (e.g., five cycles) to mature. The machine-learned clustering model can be executed for a second number of cycles (e.g., three cycles) to re-mature in the event of a cluster becoming immature. For example, the data points of the cluster can drift apart and/or become less dense as the cluster of sensor data points traverses along a path (e.g., due to a vantage point of the autonomous vehicle with respect to the cluster and/or multiple objects being improperly clustered together). However, in some implementations, an immature cluster can nonetheless be propagated to other systems in the vehicle computing system. Thus, the machine-learned clustering model can be implemented to produce the clusters.

In some implementations, the secondary perception system 220, secondary segmenter system 221, and/or clustering system 310 can be configured to operate on all of sensor data points in the sensor data 140. Additionally and/or alternatively, in some implementations, it can be desirable for the secondary perception system 220, secondary segmenter system 221, and/or clustering system 310 to operate on only a subset of sensor data points in the sensor data 140. For instance, the subset of sensor data points can exclude classified sensor data points. For example, the classified sensor data points can be or include sensor data points that correspond with (e.g., comprise) objects classified by the primary perception system 210. In some instances, this can prevent redundant processing and/or object identification. As another example, the subset of sensor data points can exclude nonviable data points. For example, nonviable sensor data points can be or include sensor data points that are outside of one or more regions of interest of the autonomous vehicle. As another example, nonviable sensor data points can be or include spurious sensor data points, such as sensor data points that are identified as spurious by the primary perception system 210 and/or any additional systems configured to identify spurious sensor data points.

Thus, in some implementations, a subset of sensor data points (e.g., fewer than all of sensor data points) that are processed by the primary perception system 210 can be clustered by the secondary perception system 220. For example, the sensor data 140 can be filtered prior to being clustered to produce the subset of sensor data points. Sensor data points that are outside of a region(s) of interest of the autonomous vehicle system can be excluded. In some implementations, the set of sensor data points can be filtered by trackability heuristics that describe a set of desired criteria relating to characteristics of the set of sensor data points to be processed by the secondary perception system 220. For example, the set of sensor data points can be filtered to remove sensor data points that are in an insufficiently dense (e.g., point-dense) and/or an overly dense (e.g., point-dense) region. For instance, a density threshold and/or range can define a minimum and/or maximum density of sensor data points (e.g., point-density) in a region proximate an autonomous vehicle, and if a density associated with the sensor data 140 in that region is outside of the density threshold and/or range (e.g., by having too few sensor data points in the region), some or all of sensor data points in the region can be filtered out such that only sensor data points within the density threshold and/or range are included. For instance, in some implementations, a high density in a region can generally be indicative of an object in that region such that removing sensor data points that are in an insufficiently dense regions can remove data points that do not and/or are not likely to correspond with an object.

As another example, the subset of sensor data points selected for clustering can exclude sensor data points that are outside of a certain proximity of autonomous vehicle 105 (e.g., beyond a distance threshold). For instance, sensor data points that are beyond a distance threshold (e.g., too far) from autonomous vehicle 105 (e.g., a center of autonomous vehicle 105 and/or a particular element, such as a closest point on a body, of autonomous vehicle 105) can be filtered out such that only sensor data points that are within the distance threshold are present in the filtered subset of sensor data points.

In some implementations, the subset of sensor data points for clustering can exclude sensor data points corresponding to one or more objects detected by the primary perception system 210. For example, sensor data points that are already classified by the primary perception system 210 (e.g., known by the primary perception system 210 to be spurious and/or belong to a classified object, such as a vehicle, bicycle, pedestrian, etc.) can be excluded. Thus, sensor data points corresponding to objects that are proximate to autonomous vehicle 105 and/or unclassifiable and/or unclassified can be clustered by the secondary perception system 220.

Additionally and/or alternatively, the secondary perception system 220 can include secondary tracker system 222. Secondary tracker system 22 can be configured to generate secondary path data that describes at least one respective tracked cluster path for the or more clusters with respect to autonomous vehicle 105. For example, once the clusters are identified (e.g., by clustering system 310), secondary tracker system 222 can determine one or more tracked cluster path respectively associated with one or more clusters described by data output by the clustering system 310. The tracked cluster path can include one or more velocities for a cluster (e.g., a speed and/or a direction for an object), such as one or more current velocities and/or one or more prior velocities. The secondary path data can be based on the previous time-based locations of the cluster, such as, for example, as a ballistic path. The ballistic path can include a simple vector that describes an instantaneous velocity and/or heading of the object.

For instance, in some implementations, secondary tracker system 222 can employ a greedy associator model. For example, the greedy associator model can locally optimize cluster selection for a particular stage of data (e.g., of the sensor data 140). In some implementations, the greedy associator model can include a long short-term memory (LSTM) model scorer. For example, in some embodiments, the long short-term memory model scorer can be configured to analyze time-series data (e.g., of the sensor data 140) to output predicted scores associated with predictions from the greedy associator model. In some implementations, the primary tracker system 212 and/or the secondary tracker system 222 can include an interacting multiple model (IMM).

The tracked cluster path can be determined over a time duration and/or interval, such as a current and/or prior duration and/or interval (e.g., a previous three seconds prior to the current time and location of the cluster). Thus, secondary tracker system 222 can determine secondary path data including respective tracked cluster paths of the clusters based on observed movement of the clusters.

Additionally, in some implementations, the secondary perception system 220 can validate a tracked cluster path of an object identified by secondary tracker system 222 by determining individual paths for sensor data points comprising the object and comparing such individual paths with the tracked cluster path. Validating and/or verifying the secondary path data can include detecting errors or inaccuracies of the secondary path data. For example, in some cases, the secondary path data can include one or more false positive conditions that can indicate movement of an object when the object is stationary (e.g., of a non-existent path). As one example, a changing perspective of a stationary object may result in perception of that the stationary object is moving (e.g., in the secondary path data). This validation can help to identify and/or remove instances of erroneous and/or low confidence (e.g., "false positive") paths, velocities, and/or objects from the data output by the secondary perception system 220. This can, in some cases, enable a lower level object recognition algorithm and/or model (e.g., a clustering algorithm and/or model, such as an unsupervised model) to be employed for object recognition in the secondary perception system 220 that, while robust, may also include a risk of providing invalid data, while avoiding the increased risk of invalid data (e.g., false positives) associated with (e.g., deriving from) the use of the lower level algorithm and/or model.

As one example, to validate the secondary path data, the secondary perception system 220 can include flow estimator system 315 configured to determine one or more sensor data point paths associated with (e.g., describing a motion of) sensor data points. For instance, flow estimator system 315 can be configured to determine a sensor data point path associated with (e.g., describing motion of) each of sensor data points in the sensor data 140. A sensor data point path can describe a path associated with (e.g., describing motion of) a sensor data point (e.g., a LIDAR point). For example, flow estimator system 315 can employ an estimation network that can determine a path (e.g., a velocity) for each sensor data point based on the sensor data 140 (e.g., sensor data over a previous time duration, such as about three seconds).

According to example aspects of the present disclosure, cluster fusion system 350 can validate a tracked cluster path for a cluster (e.g., from secondary tracking system 222) by determining a clustered sensor data point path (e.g., corresponding to a single path for the cluster) from sensor data point paths and comparing the tracked cluster path to the clustered sensor data point path. Generally, the clustered sensor data point path is not necessarily identical to the tracked cluster path for a sensor data point cluster. For instance, in one example false positive condition, it can generally be observed that a tracked cluster path for a cluster may indicate a significant (e.g., greater than about zero) velocity, whereas a velocity defined by a clustered sensor data point path for the cluster may be about zero, such as less than a threshold, such as less than a threshold of about zero. As one example of condition that can cause a false positive, the tracked cluster path could represent a forward velocity of a cluster object relative to autonomous vehicle 105, yet the velocity of the clustered sensor data point path can indicate that the cluster is stationary. Conversely, the tracked cluster path can indicate that the object is stationary while the clustered sensor data point path can indicate that the cluster is moving. Such discrepancies can be caused by the tracked cluster path being determined by a different method than the clustered sensor data point path.

On the other hand, in cases of objects corresponding to clusters that are moving (e.g., not a false positive condition), it can generally be observed that the clustered sensor data point path and the tracked cluster path can be within a margin of each other. In other words, a difference (e.g., a difference in a magnitude of velocities) between the clustered sensor data point path and the tracked cluster path for a cluster can be less than a threshold, such as about zero.

More particularly, as an example of cluster fusion system 350 validating a path from the fallback tracker, cluster fusion system 350 can determine a difference between a clustered sensor data point path and a tracked cluster path for the cluster. In some implementations, cluster fusion system 350 can validate a tracked cluster path by determining that the difference between a clustered sensor data point path and the tracked cluster path for a cluster is less than a threshold and, in response to determining that the difference is less than the threshold, cluster fusion system 350 can identify the cluster as one of the unclassifiable and/or unclassified object(s). For instance, this can indicate a general agreement between the tracked cluster path (e.g., from secondary tracker system 222) and the clustered sensor data point path (e.g., from flow estimator 315), which can typically be indicative of the presence of a real moving object (e.g., as identified by clustering system 310).

A difference between a clustered sensor data point path and a tracked cluster path for a cluster can be any suitable result of a difference operation between the clustered sensor data point path and the tracked cluster path. As one example, a difference can be and/or include a magnitude component. For example, the difference can be and/or include a magnitude difference between a velocity magnitude (e.g., speed) of the clustered sensor data point path and a velocity magnitude of the tracked cluster path. As another example, a difference can include an angular component. For example, the difference can be and/or include an angular difference between a velocity angle (e.g., direction) of the clustered sensor data point path and a velocity angle of the tracked cluster path. As another example, a difference can be a vector difference between the clustered sensor data point path and the tracked cluster path (e.g., a result of a vector subtraction operation). In some implementations, the difference can be associated with (e.g. defined at and/or for) a particular point in time. For example, the difference can be defined between velocities of the clustered sensor data point path and the tracked cluster path at the same point in time.

As another example of validating a tracked cluster path, cluster fusion system 350 can determine that a clustered sensor data point path for a cluster has a magnitude (e.g., a vector magnitude) greater than a threshold. In response to determining that the clustered sensor data point path for the cluster has a magnitude greater than the threshold, cluster fusion system 350 can identify the cluster as one of the unclassifiable and/or unclassified object(s). For instance, in some example implementations, clusters having a clustered sensor data point path having a significant magnitude (e.g., greater than zero) can generally correspond to real moving objects. In some implementations, the threshold can be and/or include a scalar threshold. For example, the threshold can be and/or include a scalar threshold such that a scalar value of the difference (e.g., a difference between magnitudes and/or angles) is compared to the scalar threshold.

As one example of determining a clustered sensor data point path, cluster fusion system 350 can aggregate sensor data point paths for some or all data points defining a single cluster to determine a clustered sensor data point path for that cluster. As used herein, aggregating sensor data point paths can include performing any suitable combinatorial operation on sensor data point paths to determine a composite and/or representative value of sensor data point paths. For example, aggregating sensor data point paths can include summing sensor data point paths. As another example, aggregating sensor data point paths can include generating a weighted sum of sensor data point paths. Additionally and/or alternatively, aggregating sensor data point paths can include removing one or more outliers from the data point paths.

Figure 3A:
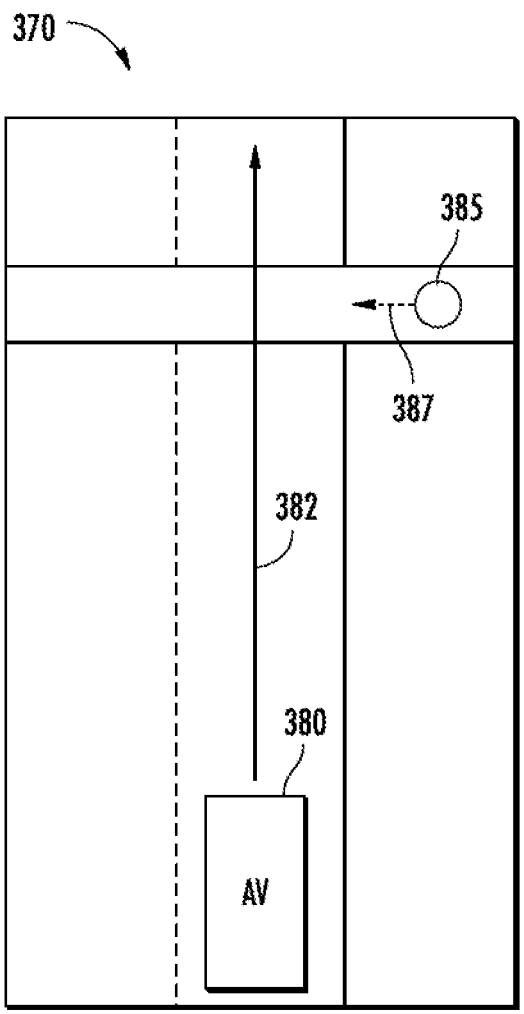
FIG. 3A depicts an example autonomous vehicle operating in an environment with a pedestrian actor.

FIG. 3A depicts an example autonomous vehicle operating in an environment with an actor object. For example, it can be desirable for autonomous vehicle 380 to navigate around object 385 (e.g., a rolling shopping cart) while preserving the safety of object 385. As illustrated in FIG. 3A, autonomous vehicle 380 can have an associated path 382, and object 385 can have an associated path 387. According to example aspects of the present disclosure, the secondary perception system 220 (FIG. 2A) can perceive object 385 and/or recognize path 387 of object 385 by clustering sensor data descriptive of object 385. For example, secondary perception system 220 (FIG. 2A) can perceive object 385 even if the primary perception system 210 (FIG. 2A) fails to perceive (e.g., classify) object 385, such as, for instance, if object 385 is obscured, unrecognizable based on training data, or unable to be perceived (e.g., unclassifiable) by the primary perception system for any other suitable reason (e.g., the object 385 may be of an irregular shape, or have other features making it difficult for the primary perception system 210 (FIG. 2A) to classify the pedestrian 385).

Figure 3B:
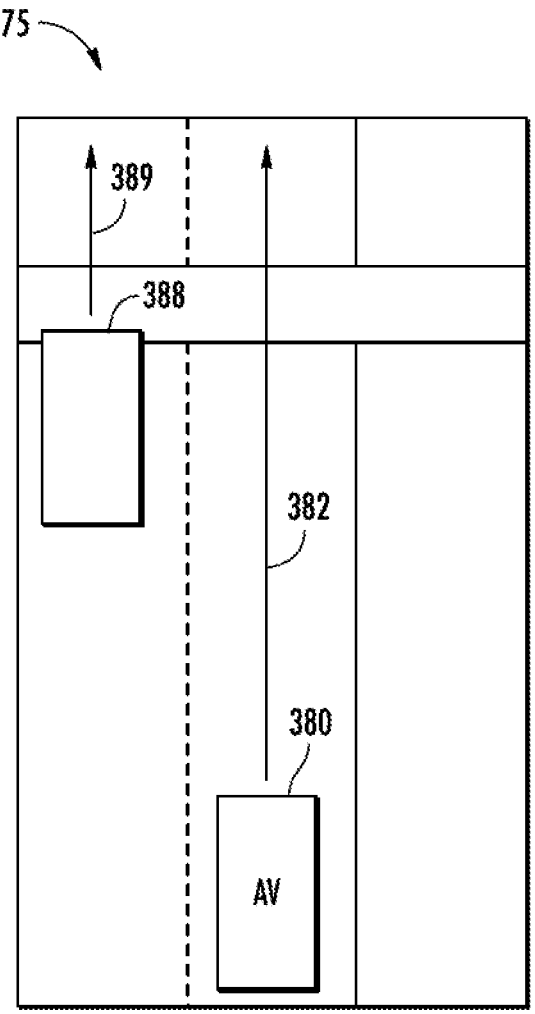
FIG. 3B depicts an example autonomous vehicle operating in an environment with a vehicle actor.

FIG. 3B depicts an example autonomous vehicle operating in an environment with a vehicle actor. For example, it can be desirable for autonomous vehicle 380 to navigate around vehicle actor 388 while preserving the safety of vehicle actor 388. As illustrated in FIG. 3A, autonomous vehicle 380 can have an associated path 382, and vehicle actor 388 can have an associated path 389. According to example aspects of the present disclosure, the secondary perception system 220 can perceive vehicle actor 388 and/or recognize path 389 of vehicle actor 388 by clustering sensor data descriptive of vehicle actor 388. For example, the secondary perception system 220 (FIG. 2A) can perceive vehicle actor 388 even if the primary perception system 210 (FIG. 2A) fails to perceive (e.g., classify) vehicle actor 388, such as, for instance, if vehicle actor 388 is obscured, unrecognizable based on training data, or unable to be perceived (e.g., unclassifiable) by the primary perception system for any other suitable reason.

Figure 4:
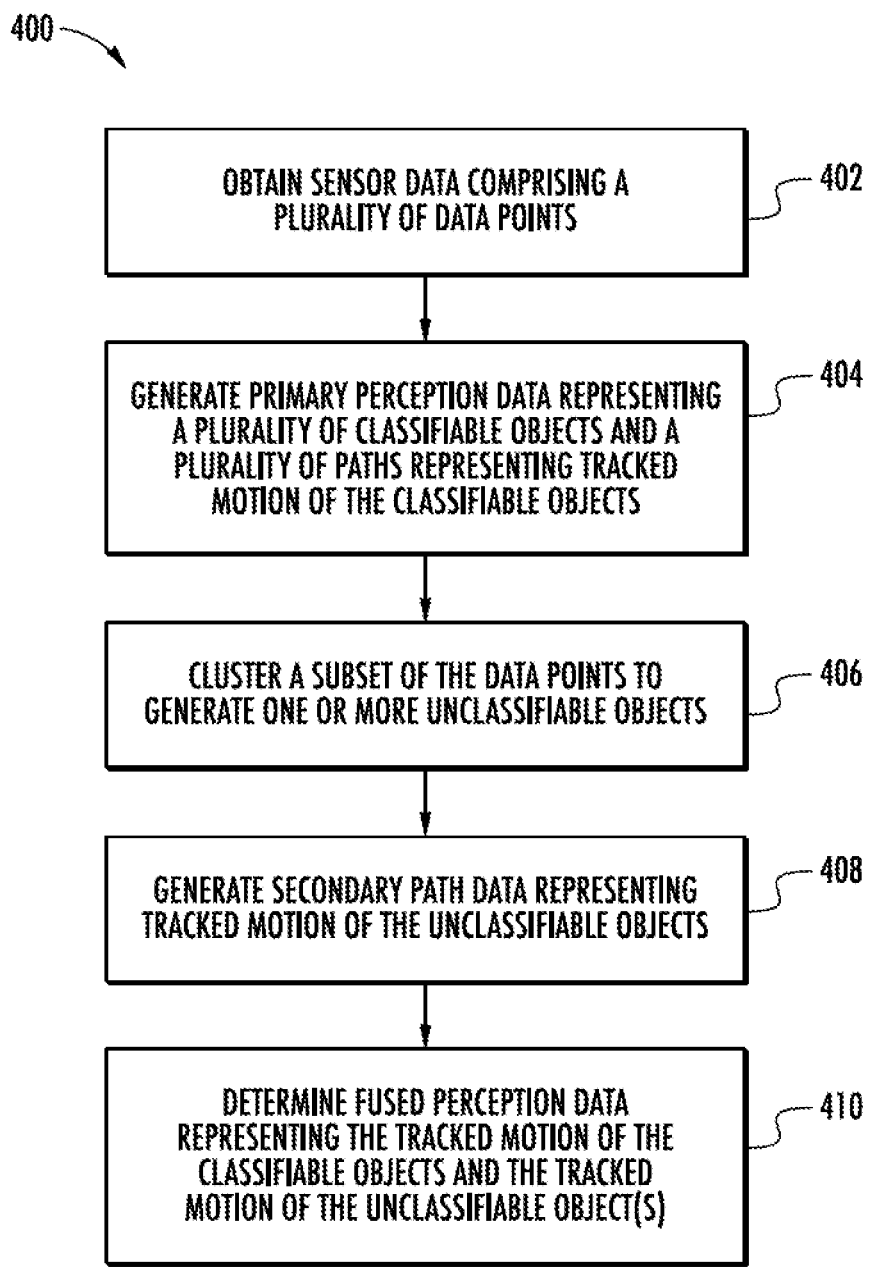
FIG. 4 depicts an example flow diagram of an example method for object perception with respect to an autonomous vehicle.

FIG. 4 depicts a flowchart diagram of an example method 400 of obtaining perception data according to example implementations of the present disclosure. One or more portion(s) of the method 400 can be implemented by one or more computing devices such as, for example, the computing devices described in FIG. 1, 2A, 2B, 8, or 9. Moreover, one or more portion(s) of the method 400 can be implemented as an algorithm on the hardware components of the device(s) described herein (e.g., as in FIG. 1, 2A, 2B, 8, or 9) to, perceive the surrounding environment (and the objects included therein) for autonomous vehicles. FIG. 4 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

The method 400 can include, at 402, obtaining sensor data including a plurality of data points. For instance, a computing system (e.g., as described above with reference to the vehicle computing system 100 of FIG. 1) can receive sensor data including one or more sensor data points from one or more sensors that are coupled to or otherwise included within the autonomous vehicle. For example, in some implementations, a perception system can be included within the vehicle computing system and configured to receive the sensor data (e.g., via a wireless or wired connection). As examples, the sensor(s) can include a Light Detection and Ranging (LIDAR) system, a Radio Detection and Ranging (RADAR) system, one or more cameras (e.g., visible spectrum cameras, infrared cameras, etc.), a positioning system (e.g., GPS), and/or other sensors. The sensor data can include information that describes the location of static objects and/or dynamic objects (actors) within the surrounding environment of the autonomous vehicle. For example, the objects can include traffic signals, additional vehicles, pedestrians, bicyclists, signs (e.g., stop signs, yield signs), and/or other objects. The sensor data can include raw sensor data and/or data that has been processed or manipulated in some manner before being provided to other systems within the autonomy computing system. The sensor data obtaining unit 805 (FIG. 8) is one example means for obtaining sensor data including a plurality of data points.

In some implementations, sensor data can define and/or include a representation of a spatial division proximate an autonomous vehicle. For example, in some implementations, each sensor data point of the sensor data can represent a space in a "grid" discretizing a region proximate an autonomous vehicle. For example, in some implementations, each sensor data point can represent a grid of about 33 centimeters.

In addition to the sensor data 140, in some implementations the vehicle computing system (e.g., the perception system) can retrieve or otherwise obtain map data that provides detailed information about the surrounding environment of the autonomous vehicle. The map data 145 can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, and/or instructions of signage (e.g., stop signs, yield signs), traffic lights (e.g., stop lights), or other traffic signals or control devices/markings (e.g., cross walks)); and/or any other map data that provides information that assists the vehicle computing system in comprehending and perceiving its surrounding environment and its relationship thereto. The map data obtaining unit 810 (FIG. 8) is one example means for obtaining map data that provides detailed information about the surrounding environment of the autonomous vehicle The method 400 can include, at 404, generating primary perception data representing a plurality of classifiable objects and a plurality of paths representing tracked motion of the classifiable objects. For example, in some implementations, the primary perception data can be obtained according to the method 600 depicted in FIG. 6. The primary perception data can be descriptive of a plurality of objects. For instance, the plurality of objects described by the primary perception data can be described at least in part by the sensor data. Additionally and/or alternatively, the plurality of objects described by the primary perception data can be described at least in part by the map data. In other words, the sensor data and/or map data can depict the plurality of objects (e.g., by capturing and/or representing the objects in data). The primary perception data can serve to identify and/or otherwise describe the objects depicted by the sensor data and/or the map data in a computer-readable and/or operable manner. The primary perception unit 815 (FIG. 8) is one example means for generating primary perception data representing a plurality of classifiable objects and a plurality of paths representing tracked motion of the classifiable objects.

Additionally and/or alternatively, the primary perception data can be descriptive of path data that describes and/or identifies a plurality of paths with respect to the autonomous vehicle and respectively associated with (e.g., describing tracked motion of) the plurality of objects. A path can describe or illustrate, by any suitable means, how an object and/or actor has been moving (e.g., over a previous time interval), is currently moving (e.g., at a current time instance), and/or is projected to move (e.g., over a future time interval, such as by a heading (e.g., a magnitude and/or a direction)). For instance, a path can define and/or include one or more velocities for an object (e.g., a speed and/or a direction for an object), such as one or more current velocities and/or one or more prior velocities. As one example, a path can depict motion (e.g., tracked motion) of an object by a time series of prior positions and/or velocities with respect to the autonomous vehicle and/or absolutely (e.g., geospatially).

Additionally and/or alternatively, the primary perception data can be descriptive of at least one classification label respectively associated with (e.g., describing motion of) at least one of a plurality of objects (e.g., classifiable objects) described by the primary perception data. For instance, at least one classification label can be an identifier of an object as belonging to a class (e.g., a predefined class) of similar objects. Class and/or category examples can include entity type (e.g., motor vehicle, nonpowered vehicle, pedestrian, etc.) and/or vehicle type (e.g., bicycle, car, truck, bus, etc.). Thus, the primary perception can classify objects that are identifiable as belonging to particular predefined class.

In some implementations, the primary perception data can be generated based at least in part on class-based assumptions about the objects. For example, the primary perception data can be generated by classifying the objects with respect to predefined classes (e.g., vehicle, pedestrian, etc.) and generating the primary perception data based at least in part on characteristics of those classes.

The method 400 can include, at 406, clustering a subset of the sensor data points to generate one or more unclassifiable objects. The set of sensor data points can include some or all of the sensor data points in the sensor data. According to example aspects of the present disclosure, the computing system can employ any suitable clustering algorithm and/or clustering model (e.g., a machine-learned clustering model) to cluster the set of sensor data points. Generally, the clustering algorithm and/or clustering model can define neighborhoods of sensor data points, and the neighborhood can be resolved to clusters. For example, in some implementations, the computing system can employ an unsupervised clustering model, such as, for example, an unsupervised machine-learned clustering model. Additionally and/or alternatively, in some implementations, the computing system can employ a connected component clustering model. The secondary perception unit 820 (FIG. 8) is one example means for clustering a subset of the sensor data points to generate one or more unclassifiable objects.

In some implementations, the set of sensor data points can be clustered by a machine-learned clustering model that is configured to receive the set of sensor data points and, in response to receipt of the set of sensor data points, produce as output the cluster(s). For instance, in some implementations, a computing system can input the set of sensor data points into the machine-learned clustering model. The machine-learned clustering model can be configured to receive the set of sensor data points, and in response to receipt of the set of sensor data points by the machine-learned clustering model, produce, as output, one or more clusters of sensor data points in the sensor data. In some implementations, the machine-learned clustering model can be executed for several cycles, allowing the clusters to mature. For example, the maturing of the clusters can refer to allowing the clusters to form, stabilize, and/or converge. For instance, in some implementations, the machine-learned clustering model can be executed for a first number of cycles (e.g., five cycles) to mature. The machine-learned clustering model can be executed for a second number of cycles (e.g., three cycles) to re-mature in the event of a cluster becoming immature. For example, the data points of the cluster can drift apart and/or become less dense as the cluster of sensor data points traverses along a path (e.g., due to a vantage point of the autonomous vehicle with respect to the cluster and/or multiple objects being improperly clustered together). However, in some implementations, an immature cluster can nonetheless be propagated to other systems in the vehicle computing system. Thus, the machine-learned clustering model can be implemented to produce the clusters.

In some implementations, the computing system (e.g., a secondary perception system) can be configured to operate on all of the sensor data points in sensor data. Additionally and/or alternatively, in some implementations, it can be desirable for the computing system (e.g., a secondary perception system) to operate on only a subset of the sensor data points in the sensor data. For instance, the subset of the sensor data points can exclude classified sensor data points. For example, the classified sensor data points can be or include sensor data points that correspond with (e.g., comprise) objects classified by the computing system (e.g., a primary perception system). In some instances, this can prevent redundant processing and/or object identification. As another example, the subset of the sensor data points can exclude nonviable data points. For example, nonviable sensor data points can be or include sensor data points that are outside of one or more regions of interest of the autonomous vehicle. As another example, nonviable sensor data points can be or include spurious sensor data points, such as sensor data points that are identified as spurious by the computing system (e.g., a primary perception system) and/or any additional systems configured to identify spurious sensor data points.

Thus, in some implementations, a subset of the sensor data points (e.g., fewer than all of the sensor data points) that are processed by the computing system (e.g., a primary perception system) can be clustered by the computing system (e.g., a secondary perception system). For example, the sensor data can be filtered prior to being clustered to produce the subset of the sensor data points. Sensor data points that are outside of a region of interest of the autonomous vehicle system can be excluded. In some implementations, the set of sensor data points can be filtered by trackability heuristics that describe a set of desired criteria relating to characteristics of the set of sensor data points to be processed by the computing system (e.g., a secondary perception system). For example, the set of sensor data points can be filtered to remove sensor data points that are in an insufficiently dense (e.g., point-dense) and/or an overly dense (e.g., point-dense) region. For instance, a density threshold and/or range can define a minimum and/or maximum density of sensor data points (e.g., point-density) in a region proximate an autonomous vehicle, and if a density associated with the sensor data in that region is outside of the density threshold and/or range (e.g., by having too few sensor data points in the region), some or all of the sensor data points in the region can be filtered out such that only sensor data points within the density threshold and/or range are included. For instance, in some implementations, a high density in a region can generally be indicative of an object in that region.

As another example, the subset of sensor data points selected for clustering can exclude sensor data points that are outside of a certain proximity of the autonomous vehicle (e.g., beyond a distance threshold). For instance, sensor data points that are beyond a distance threshold (e.g., too far) from an autonomous vehicle (e.g., a center of an autonomous vehicle and/or a particular element, such as a closest point on a body, of the autonomous vehicle) can be filtered out such that only sensor data points that are within the distance threshold are present in the filtered subset of sensor data points.

In some implementations, the subset of sensor data points for clustering can exclude sensor data points corresponding to one or more objects detected by the computing system (e.g., a primary perception system). For example, sensor data points that are already classified by the computing system (e.g., a primary perception system) (e.g., known by the computing system (e.g., a primary perception system) to be spurious and/or belong to a classified object, such as a vehicle, bicycle, pedestrian, etc.) can be excluded. Thus, sensor data points corresponding to objects that are proximate to the autonomous vehicle and/or unclassifiable and/or unclassified can be clustered by the computing system (e.g., a secondary perception system).

The method 400 can include, at 408, generating secondary path data representing tracked motion of the one or more unclassifiable objects. For example, a computing system can generate secondary path data that describes at least one respective tracked cluster path for or more clusters with respect to an autonomous vehicle. For example, once the clusters are identified (e.g., by the clustering model), the computing system (e.g., a secondary tracker system) can determine a tracked cluster path associated with a cluster. The tracked cluster path can include one or more velocities for a cluster (e.g., a speed and/or a direction for an object), such as one or more current velocities and/or one or more prior velocities. The secondary path data can be based on the previous time-based locations of the cluster, such as, for example, as a ballistic path. The ballistic path can include a simple vector that describes an instantaneous velocity and/or heading of the object. For instance, in some implementations, the computing system (e.g., a secondary tracker system) can employ a greedy associator model. In some implementations, the greedy associator model can include a long short-term memory (LSTM) model scorer. In some implementations, the computing system (e.g., the primary tracker system and/or the secondary tracker system) can include an interacting multiple model (IMM). The secondary perception unit 820 (FIG. 8) is one example means for generating secondary path data representing tracked motion of the one or more unclassifiable objects.

The tracked cluster path can be determined over a time duration and/or interval, such as a current and/or prior duration and/or interval (e.g., a previous three seconds prior to the current time and location of the cluster). Thus, the computing system can determine secondary path data including respective tracked cluster paths of the clusters based on observed movement of the clusters.

The method 400 can include, at 410, determining fused perception data representing the tracked motion of the plurality of classifiable objects and the tracked motion of the unclassifiable objects. For instance, a computing system (e.g., a perception fusion system) can fuse (e.g., combine and/or reconcile) secondary perception data describing objects (e.g., actors) and/or paths from a secondary perception system with primary perception data describing the classified objects from a primary perception system to better understand an environment of the autonomous vehicle. For example, in some implementations, all of the objects and/or paths from the primary perception system and/or the secondary perception system can be fused into fused perception data. As another example, in some implementations, the fusion step can include deduplicating objects and/or that are recognized by both the primary perception system and the secondary perception system. The perception fusion unit 825 (FIG. 8) is one example means for determining fused perception data representing the tracked motion of the plurality of classifiable objects and the tracked motion of the unclassifiable objects.

Figure 5:
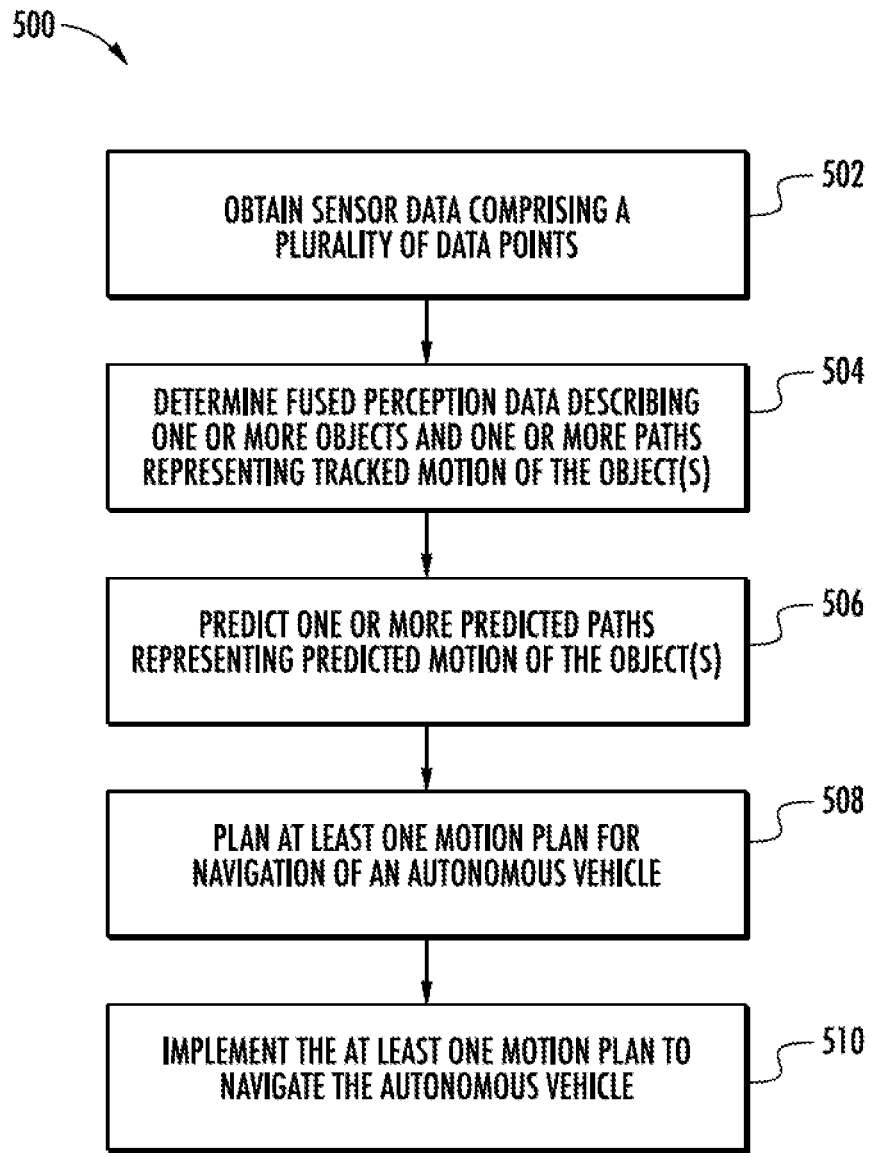
FIG. 5 depicts an example flow diagram of an example method for object perception with respect to an autonomous vehicle.

FIG. 5 depicts a flowchart diagram of an example method 500 for navigating an autonomous vehicle. One or more portion(s) of the method 500 can be implemented by one or more computing devices such as, for example, the computing devices described in FIG. 1, 2A, 2B, 8, or 9. Moreover, one or more portion(s) of the method 500 can be implemented as an algorithm on the hardware components of the device(s) described herein (e.g., as in FIG. 1, 2A, 2B, 8, or 9) to, perceive the surrounding environment (and the objects included therein) for autonomous vehicles. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

The method 500 can include, at 502, obtaining sensor data including a plurality of data points. For instance, a computing system (e.g., the vehicle computing system 100 of FIG. 1) can receive sensor data including one or more sensor data points from one or more sensors that are coupled to or otherwise included within the autonomous vehicle. For example, in some implementations, a perception system can be included within the vehicle computing system and configured to receive the sensor data. As examples, the sensor(s) can include a Light Detection and Ranging (LIDAR) system, a Radio Detection and Ranging (RADAR) system, one or more cameras (e.g., visible spectrum cameras, infrared cameras, etc.), a positioning system (e.g., GPS), and/or other sensors. The sensor data can include information that describes the location of static objects and/or dynamic objects (actors) within the surrounding environment of the autonomous vehicle. For example, the objects can include traffic signals, additional vehicles, pedestrians, bicyclists, signs (e.g., stop signs, yield signs), and/or other objects. The sensor data can include raw sensor data and/or data that has been processed or manipulated in some manner before being provided to other systems within the autonomy computing system. The sensor data obtaining unit 805 (FIG. 8) is one example means for obtaining sensor data including a plurality of data points.

In some implementations, sensor data can define and/or include a representation of a spatial division proximate an autonomous vehicle. For example, in some implementations, each sensor data point of the sensor data can represent a space in a "grid" discretizing a region proximate an autonomous vehicle. For example, in some implementations, each sensor data point can represent a grid of about 33 centimeters.

In addition to the sensor data, in some implementations the vehicle computing system (e.g., the perception system) can retrieve or otherwise obtain map data that provides detailed information about the surrounding environment of the autonomous vehicle. The map data can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, and/or instructions of signage (e.g., stop signs, yield signs), traffic lights (e.g., stop lights), or other traffic signals or control devices/markings (e.g., cross walks)); and/or any other map data that provides information that assists the vehicle computing system in comprehending and perceiving its surrounding environment and its relationship thereto. The map data obtaining unit 810 (FIG. 8) is one example means for obtaining map data that provides detailed information about the surrounding environment of the autonomous vehicle.

The method 500 can include, at 504, determining fused perception data describing one or more objects and one or more paths representing tracked motion of the objects. For instance, the fused perception data can be obtained according to the method 400 depicted in FIG. 4. For example, determining fused perception data can include obtaining sensor data including a plurality of data points, generating primary perception data representing a plurality of classifiable objects and a plurality of paths representing tracked motion of the classifiable objects, clustering a subset of the sensor data points to generate one or more unclassifiable objects, generating secondary path data representing tracked motion of the one or more unclassifiable objects, determining fused perception data representing the tracked motion of the plurality of classifiable objects and the tracked motion of the unclassifiable objects. The primary perception unit 815 (FIG. 8), the secondary perception unit 820 (FIG. 8), and/or perception fusion unit 825 (FIG. 8) are example means for determining fused perception data describing one or more objects and one or more paths representing tracked motion of the objects.

The method 500 can include, at 506, predicting one or more predicted paths representing predicted motion of the one or more objects. For instance, a computing system (e.g., the prediction system 160 of FIG. 1) can generate prediction data associated with such object(s). The prediction data can be indicative of one or more predicted future locations of each respective object. For example, the prediction system can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data can be indicative of the speed and/or acceleration at which the respective object is predicted to travel along its associated predicted motion trajectory. In some implementations, the prediction data can include a predicted object intention (e.g., a right turn) based on physical attributes of the object. The path/behavior forecasting unit 830 (FIG. 8) is one example means for predicting one or more predicted paths representing predicted motion of the one or more objects.

The method 500 can include, at 508, planning at least one motion plan for navigation of an autonomous vehicle. For instance, a computing system, (e.g., the motion planning system 165 of FIG. 1) can determine a motion plan for the vehicle based at least in part on perception data, prediction data, and/or other data. A motion plan can include vehicle actions (e.g., planned vehicle trajectories, speed(s), acceleration(s), intention, other actions, etc.) with respect to one or more of the objects within the surrounding environment of the vehicle as well as the objects' predicted movements. For instance, the computing system can implement an optimization algorithm, model, etc. that considers cost data associated with a vehicle action as well as other objective functions (e.g., cost functions based on speed limits, traffic lights, etc.), if any, to determine optimized variables that make up the motion plan. The computing system can determine that the vehicle can perform a certain action (e.g., pass an object, etc.) without increasing the potential risk to the vehicle and/or violating any traffic laws (e.g., speed limits, lane boundaries, signage, etc.). For instance, the computing system can evaluate one or more of the predicted motion trajectories of one or more objects during its cost data analysis as it determines an optimized vehicle trajectory through the surrounding environment. The computing system can generate cost data associated with such trajectories. In some implementations, one or more of the predicted motion trajectories may not ultimately change the motion of the vehicle (e.g., due to an overriding factor). In some implementations, the motion plan may define the vehicle's motion such that the vehicle avoids the object(s), reduces speed to give more leeway to one or more of the object(s), proceeds cautiously, performs a stopping action, etc. The motion planning unit 835 (FIG. 8) is one example means for planning at least one motion plan for navigation of an autonomous vehicle.

In some implementations, the computing system can be configured to continuously update the vehicle's motion plan and a corresponding planned vehicle motion trajectory. For example, in some implementations, the computing system can generate new motion plan(s) for the vehicle (e.g., multiple times per second). Each new motion plan can describe a motion of the vehicle over the next planning period (e.g., next several seconds). Moreover, a new motion plan may include a new planned vehicle motion trajectory. Thus, in some implementations, the computing system can continuously operate to revise or otherwise generate a short-term motion plan based on the currently available data.

The method 500 can include, at 510, implementing the at least one motion plan to navigate the autonomous vehicle. For example, in some implementations, once the computing system (e.g., a planning optimizer) has identified the optimal motion plan (or some other iterative break occurs), the optimal motion plan (and the planned motion trajectory) can be selected and executed by the vehicle. The vehicle control unit 840 (FIG. 8) is one example means for implementing the at least one motion plan to navigate the autonomous vehicle.

Figure 6:
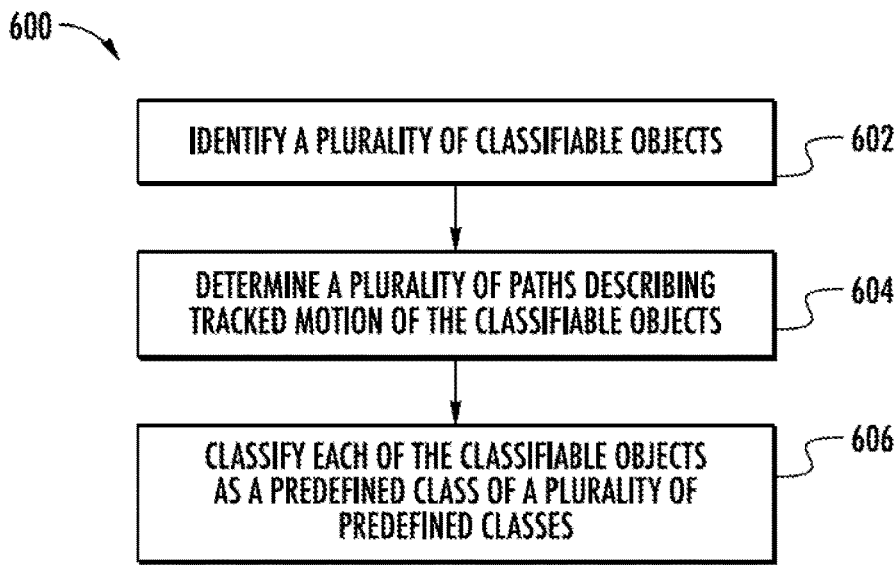
FIG. 6 depicts an example flow diagram of an example method for object perception with respect to an autonomous vehicle.

FIG. 6 depicts a flowchart diagram of an example method 600 for determining primary perception data according to example implementations of the present disclosure. One or more portion(s) of the method 600 can be implemented by one or more computing devices such as, for example, the computing devices described in FIG. 1, 2A, 2B, 8, or 9. Moreover, one or more portion(s) of the method 600 can be implemented as an algorithm on the hardware components of the device(s) described herein (e.g., as in FIG. 1, 2A, 2B, 8, or 9) to, perceive the surrounding environment (and the objects included therein) for autonomous vehicles. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

The method 600 can include, at 602, identifying a plurality of classifiable objects. For example, in some implementations, a computing system can employ one or more machine-learned object recognition models to identify the plurality of classifiable objects. The primary perception unit 815 (FIG. 8) is one example means for identifying a plurality of classifiable objects.

The method 600 can include, at 604, determining a plurality of paths describing tracked motion of the plurality of classifiable objects. For example, in some implementations, a computing system (e.g., a primary tracker) can analyze a time series (e.g., a prior time series) of sensor data to determine one or more velocities associated with the classifiable objects. For example, in some implementations, the computing system can employ an interacting multiple model (IMM) to determine the plurality of paths for the plurality of classifiable objects. The primary perception unit 815 (FIG. 8) is one example means for determining a plurality of paths describing tracked motion of the plurality of classifiable objects.

The method 600 can include, at 606, classifying each of the plurality of classifiable objects as a predefined class of a plurality of predefined classes. For example, in some implementations, one or more classification models (e.g., machine-learned models) can be configured to receive some or all of the sensor data and output classifications associated with objects in the sensor data (e.g., the plurality of classifiable objects). The primary perception unit 815 (FIG. 8) is one example means for classifying each of the plurality of classifiable objects as a predefined class of a plurality of predefined classes.

Figure 7:
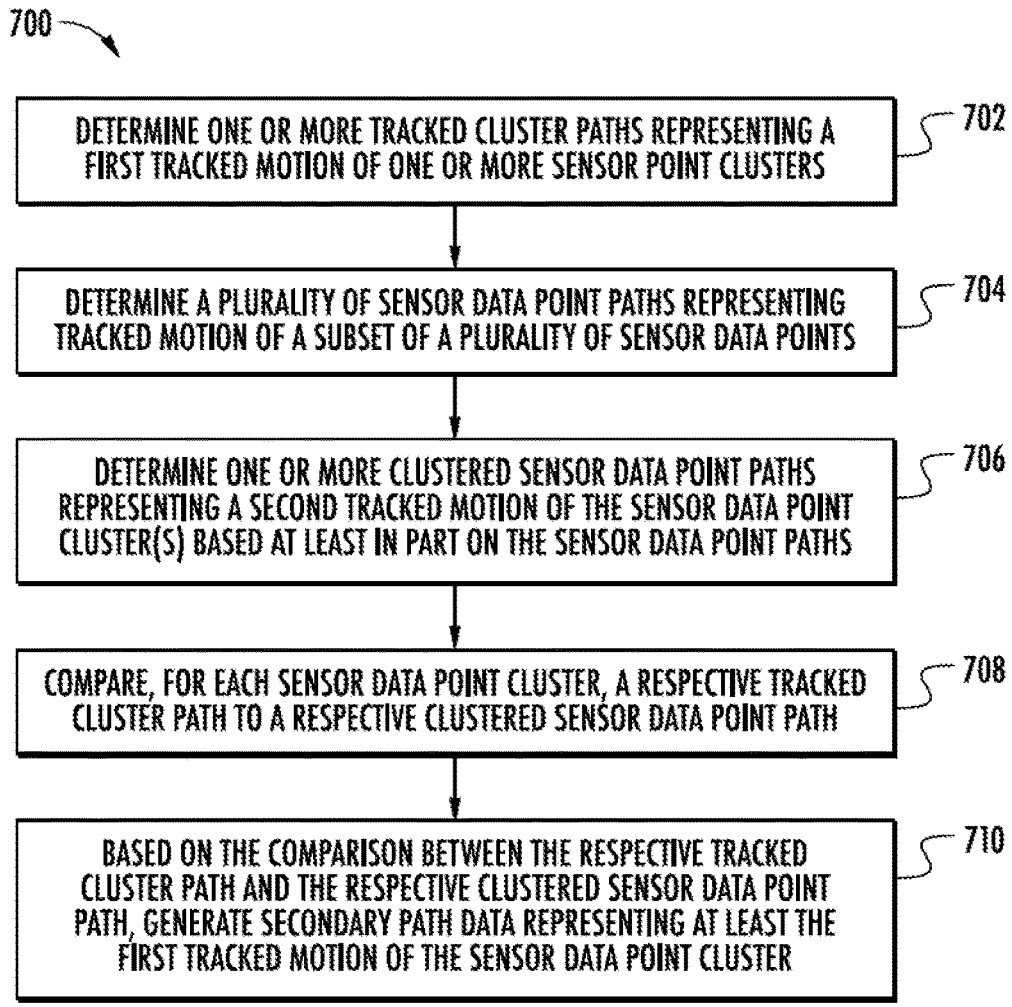
FIG. 7 depicts an example flow diagram of an example method for motion planning with respect to an autonomous vehicle.

FIG. 7 depicts a flowchart diagram of an example method 700 for determining secondary perception data according to example implementations of the present disclosure. One or more portion(s) of the method 700 can be implemented by one or more computing devices such as, for example, the computing devices described in FIG. 1, 2A, 2B, 8, or 9. Moreover, one or more portion(s) of the method 700 can be implemented as an algorithm on the hardware components of the device(s) described herein (e.g., as in FIG. 1, 2A, 2B, 8, or 9) to, perceive the surrounding environment (and the objects included therein) for autonomous vehicles. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

The method 700 can include, at 702, determining one or more tracked cluster paths representing a first tracked motion of one or more sensor data point clusters. For example, a computing system can analyze sensor data (e.g., a time series of sensor data) to determine the one or more tracked cluster paths. For example, in some implementations, the computing system can employ an interacting multiple model (IMM) to determine the one or more tracked cluster paths. In some implementations, the computing system can employ a greedy associator model to determine the one or more tracked cluster paths. In some implementations, the greedy associator model can include a long short-term memory (LSTM) model scorer. The secondary perception unit 820 (FIG. 8) is one example means for determining one or more tracked cluster paths representing a first tracked motion of one or more sensor data point clusters.

The method 700 can include, at 704, determining a plurality of sensor data point paths representing tracked motion of a subset of a plurality of sensor data points. For example, a computing system (e.g., a flow estimator system) can be configured to determine one or more sensor data point paths associated with (e.g., describing a motion of) sensor data points. For instance, the computing system can be configured to determine a sensor data point path associated with (e.g., describing motion of) each of sensor data points in a body of sensor data. A sensor data point path can describe a path associated with (e.g., describing motion of) a sensor data point (e.g., a LIDAR point). For example, a computing system can employ an estimation network that can determine a path (e.g., a velocity) for each sensor data point based on the sensor data (e.g., sensor data over a previous time duration, such as about three seconds). The secondary perception unit 820 (FIG. 8) is one example means for determining a plurality of sensor data point paths representing tracked motion of a subset of a plurality of sensor data points.

The method 700 can include, at 706, determining one or more clustered sensor data point paths representing a second tracked motion of the one or more sensor data point clusters based at least in part on the plurality of sensor data point paths. For example, a clustered sensor data point path for a cluster can describe the second tracked motion of the one or more sensor data point clusters based on the sensor data point paths for sensor data points comprising the cluster. As one example of determining a clustered sensor data point path, a computing system (e.g., a cluster fusion system) can aggregate sensor data point paths for some or all data points defining a single cluster to determine a clustered sensor data point path for that cluster. As used herein, aggregating sensor data point paths can include performing any suitable combinatorial operation on the sensor data point paths to determine a composite and/or representative value of the sensor data point paths. For example, aggregating sensor data point paths can include summing the sensor data point paths. As another example, aggregating sensor data point paths can include generating a weighted sum of the sensor data point paths. Additionally and/or alternatively, aggregating sensor data point paths can include removing one or more outliers from the data point paths. The secondary perception unit 820 (FIG. 8) is one example means for determining one or more clustered sensor data point paths representing a second tracked motion of the one or more sensor data point clusters based at least in part on the plurality of sensor data point paths.

The method 700 can include, at 708, comparing, for each sensor data point cluster of the one or more sensor data point clusters, a respective tracked cluster path to a respective clustered sensor data point path. Based on the comparison between the respective tracked cluster path and the respective clustered sensor data point path, the method 700 can include, at 710, generating secondary path data representing at least the first tracked motion of the sensor data point cluster. In other words, the method can include validating the respective tracked cluster path for a cluster by comparing the respective paths for the cluster and including the first tracked motion and/or the cluster in the secondary path data based on the comparison. More particularly, as an example of validating a path from the fallback tracker, a computing system (e.g., a cluster fusion system) can determine a difference between a clustered sensor data point path and a tracked cluster path for a cluster. In some implementations, the computing system can validate a tracked cluster path by determining that the difference between a clustered sensor data point path and the tracked cluster path for a cluster is less than a threshold and, in response to determining that the difference is less than the threshold, the computing system can identify the cluster as one of the unclassifiable and/or unclassified object(s). For instance, this can indicate a general agreement between the tracked cluster path and the clustered sensor data point path, which can typically be indicative of the presence of a real moving object. The secondary perception unit 820 (FIG. 8) is one example means for comparing, for each sensor data point cluster of the one or more sensor data point clusters, a respective tracked cluster path to a respective clustered sensor data point path. The secondary perception unit 820 (FIG. 8) is one example means for generating secondary path data representing at least the first tracked motion of the sensor data point cluster.

A difference between a clustered sensor data point path and a tracked cluster path for a cluster can be any suitable result of a difference operation between the clustered sensor data point path and the tracked cluster path. As one example, a difference can be and/or include a magnitude component. For example, the difference can be and/or include a magnitude difference between a velocity magnitude (e.g., speed) of the clustered sensor data point path and a velocity magnitude of the tracked cluster path. As another example, a difference can include an angular component. For example, the difference can be and/or include an angular difference between a velocity angle (e.g., direction) of the clustered sensor data point path and a velocity angle of the tracked cluster path. As another example, a difference can be a vector difference between the clustered sensor data point path and the tracked cluster path (e.g., a result of a vector subtraction operation). In some implementations, the difference can be associated with (e.g. defined at and/or for) a particular point in time. For example, the difference can be defined between velocities of the clustered sensor data point path and the tracked cluster path at the same point in time.

As another example of validating a tracked cluster path, the computing system can determine that a clustered sensor data point path for a cluster has a magnitude (e.g., a vector magnitude) greater than a threshold. In response to determining that the clustered sensor data point path for the cluster has a magnitude greater than the threshold, the computing system can identify the cluster as one of the unclassifiable and/or unclassified object(s). For instance, in some example implementations, clusters having a clustered sensor data point path having a significant magnitude (e.g., greater than zero) can generally correspond to real moving objects. In some implementations, the threshold can be and/or include a scalar threshold. For example, the threshold can be and/or include a scalar threshold such that a scalar value of the difference (e.g., a difference between magnitudes and/or angles) is compared to the scalar threshold.

Figure 8:
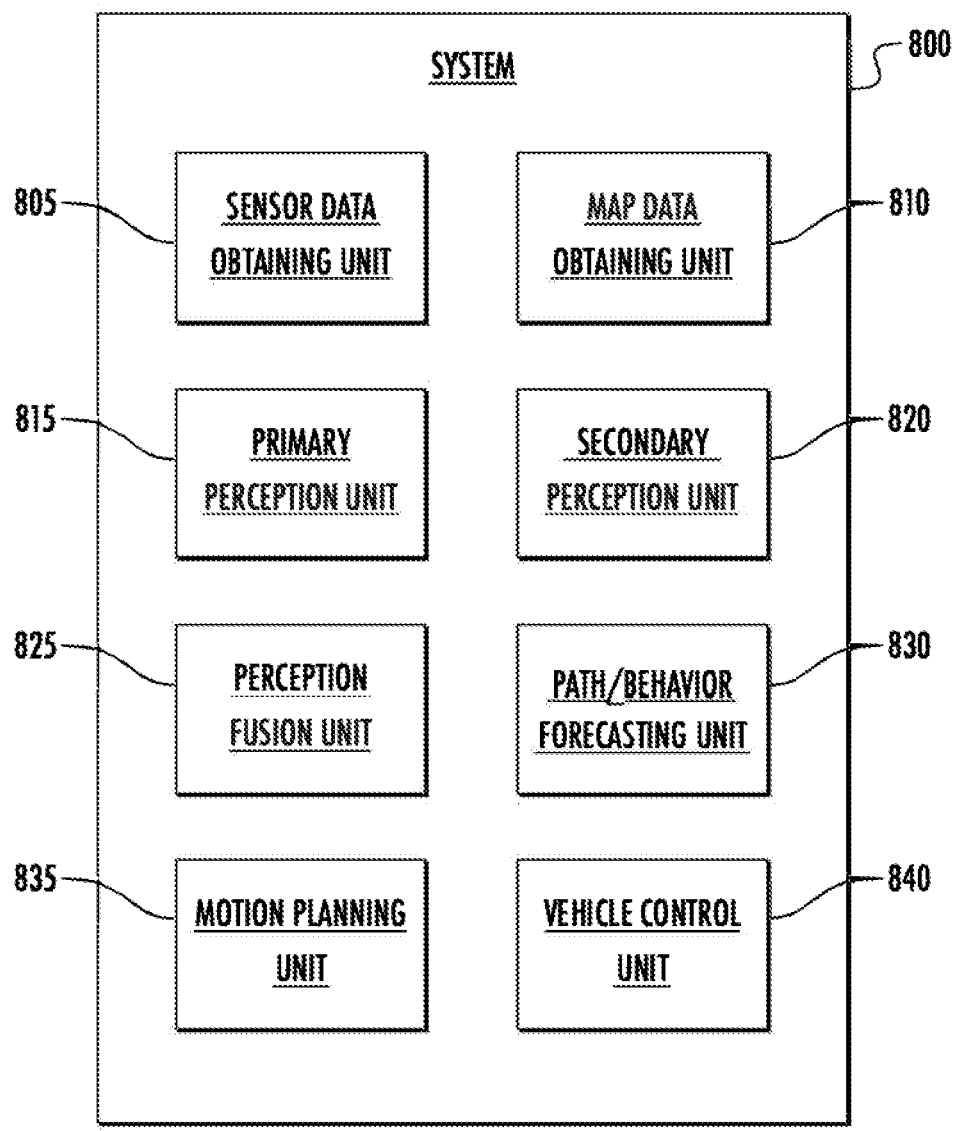
FIG. 8 depicts a block diagram of an example computing system according to example implementations of the present disclosure.

Various means can be configured to perform the methods and processes described herein. For example, FIG. 8 depicts a block diagram of an example computing system 800 configured to perform the methods and processes as described herein. For instance, computing system 800 can include sensor data obtaining unit(s) 805, map data obtaining unit(s) 810, primary perception unit(s) 815, secondary perception unit(s) 820, perception fusion unit(s) 825, path/behavior forecasting unit(s) 830, motion planning unit(s) 835, vehicle controlling unit(s) 840, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain sensor data including one or more sensor data points from one or more sensors that generate sensor data relative to an autonomous vehicle. In some implementations, the means can be configured to obtain sensor data associated with (e.g., describing) the autonomous vehicle's surrounding environment as well as the position and movement of the autonomous vehicle. In some implementations, the means can be configured to obtain LIDAR data (e.g., a three-dimensional point cloud) obtained from a LIDAR system. In some implementations, the means can be configured to obtain image data obtained from one or more cameras. In some implementations, the means can be configured to obtain a birds-eye view representation of data obtained relative to the autonomous vehicle. In some implementations, the means can be configured to obtain sensor data represented as a multi-dimensional tensor having a height dimension and a time dimension stacked into a channel dimension associated with (e.g., defining) the multi-dimensional tensor. A sensor data obtaining unit 805 is one example of a means for obtaining the sensor data as described herein.

The means can be configured to access or otherwise obtain map data associated with (e.g., describing) a surrounding geographic environment of the autonomous vehicle. More particularly, in some implementations, the means can be configured to access or otherwise obtain map data that provides information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system in processing, analyzing, and perceiving its surrounding environment and its relationship thereto. In some implementations, the means can be configured to access or otherwise obtain map data that is provided in a birds-eye view representation, such as generated by rasterization or other suitable processing format. A map data obtaining unit 810 is one example of a means for obtaining such map data as described herein.

The means can be configured to access or otherwise obtain primary perception data. For instance, the means can be configured to receive sensor data including a plurality of sensor data points as input. Furthermore, in response to receipt of the sensor data as input, the means can be configured to generate primary perception data representing a plurality of classifiable objects and a plurality of paths representing tracked motion of the plurality of classifiable objects. In some implementations, each classifiable object can be classified by the means as a predefined class of a plurality of predefined classes of objects. A primary perception unit 815 is one example of a means for obtaining such primary perception data as described herein.

The means can be configured to access or otherwise obtain secondary perception data. For instance, the means can be configured to receive sensor data including a plurality of sensor data points as input. Furthermore, in response to receipt of the sensor data as input, the means can be configured to generate secondary perception data descriptive of one or more unclassified objects. For instance, the means can be configured to cluster a subset of the plurality of sensor data points of the sensor data to generate one or more sensor data point clusters representing unclassifiable object(s) that are not classifiable by the means as any one of the plurality of predefined classes of objects. Additionally and/or alternatively, the means can be configured to generate secondary path data representing tracked motion of the unclassifiable object(s). A secondary perception unit 820 is one example of a means for accessing or otherwise obtaining such secondary perception data as described herein.

The means can be configured to determine fused perception data representing a tracked motion of a plurality of classifiable objects and a tracked motion of one or more unclassifiable objects. A perception fusion unit 825 is one example of a means for obtaining such fused perception data as described herein.

The means can be configured to generate motion forecast data that describes or predicts the path/behavior of one or more actors with respect to the autonomous vehicle. A path/behavior forecasting unit 830 is one example of a means for generating motion forecast data as described herein.

The means can be configured to determine a motion plan for the autonomous vehicle based at least in part on the motion forecast data. The means can be configured to determine a motion plan for the autonomous vehicle that best navigates the autonomous vehicle along a determined travel route relative to the objects at such locations. In some implementations, the means can be configured to determine a cost function for each of one or more candidate motion plans for the autonomous vehicle based at least in part on the current locations and/or predicted future locations and/or moving paths of the objects. A motion planning unit 835 is one example of a means for determining a motion plan for the autonomous vehicle.

The means can be configured to control one or more vehicle controls (e.g., actuators or other devices that control gas flow, steering, braking, etc.) to execute the selected motion plan. A vehicle controlling unit 840 is one example of a means for controlling motion of the autonomous vehicle to execute the motion plan.

Figure 9:
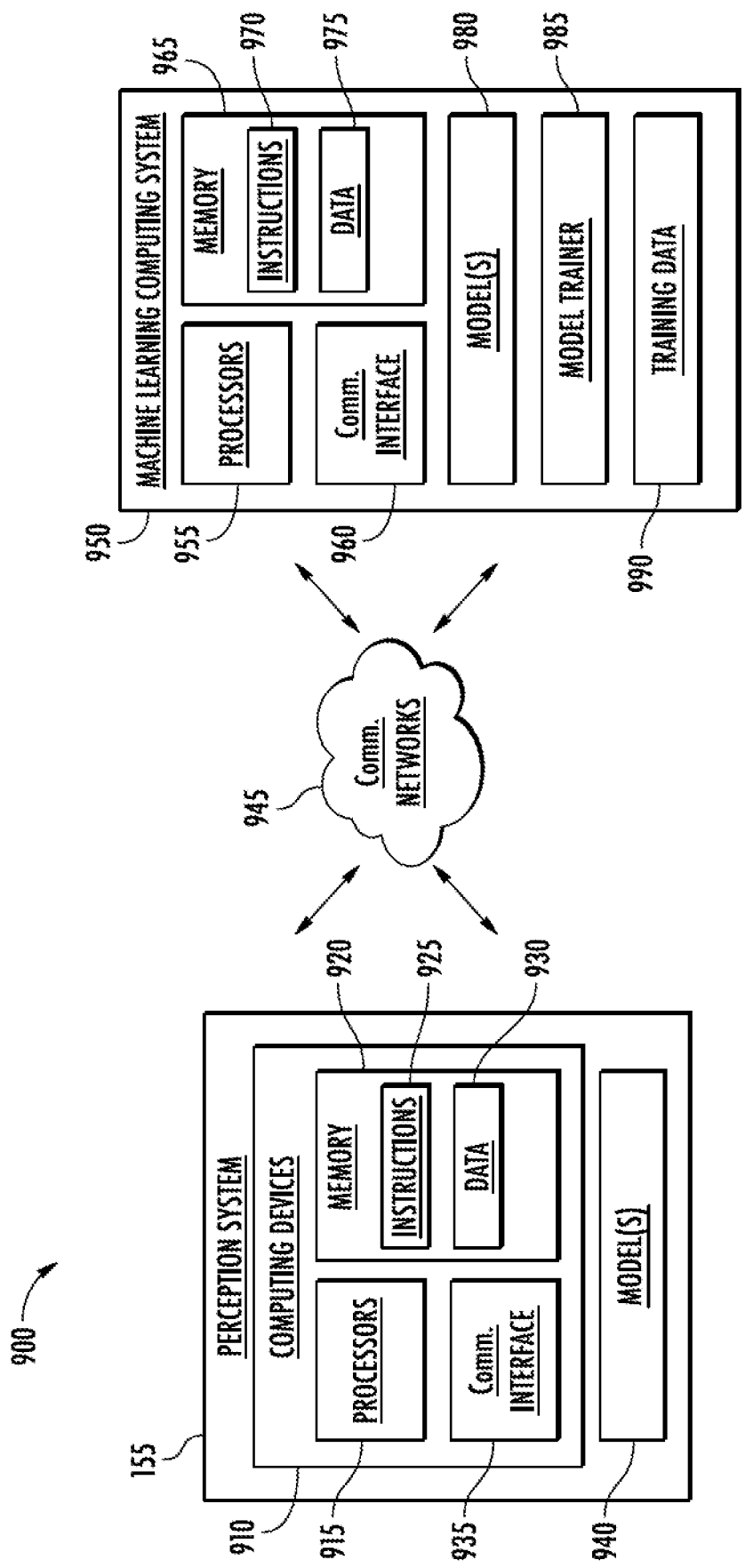
FIG. 9 depicts a block diagram of an example computing system according to example implementations of the present disclosure.

FIG. 9 depicts example system components of an example system 900 according to example implementations of the present disclosure. The example system 900 illustrated in FIG. 9 is provided as an example only. The components, systems, connections, and/or other aspects illustrated in FIG. 9 are optional and are provided as examples of what is possible, but not required, to implement the present disclosure. The example system 900 can include a perception system 155 and a machine learning computing system 950 that are communicatively coupled over one or more network(s) 945. As described herein, the perception system 155 can be implemented onboard a vehicle (e.g., as a portion of the vehicle computing system 100) and/or can be remote from a vehicle (e.g., as a portion of an operations computing system 195). In either case, a vehicle computing system 100 can utilize the operations and model(s) of the perception system 155 (e.g., locally, via wireless network communication, etc.).

The perception system 155 can include one or computing device(s) 910. The computing device(s) 910 of the perception system 155 can include processor(s) 915 and a memory 920. The one or more processor(s) 915 can be any suitable processing device (e.g., a processor core, a microprocessor, an ASIC, a FPGA, a controller, a microcontroller, etc.) and can be one processor or a plurality of processors that are operatively connected. The memory 920 can include one or more non-transitory computer-readable storage media, such as RAM, ROM, EEPROM, EPROM, one or more memory devices, flash memory devices, etc., and/or combinations thereof.

The memory 920 can store information that can be obtained by the one or more processor(s) 915. For instance, the memory 920 (e.g., one or more non-transitory computer-readable storage mediums, memory devices, etc.) can include computer-readable instructions 925 that can be executed by the one or more processors 915. The instructions 925 can be software written in any suitable programming language or can be implemented in hardware. Additionally, or alternatively, the instructions 925 can be executed in logically and/or virtually separate threads on processor(s) 915.

For example, the memory 920 can store instructions 925 that when executed by the one or more processors 915 cause the one or more processors 915 (e.g., of the perception system 155) to perform operations such as any of the operations and functions of the perception system 155 and/or for which the perception system 155 is configured, as described herein (e.g., with reference to FIGS. 2-7). Example operations including determining primary perception data, determining secondary perception data, and/or determining fused perception data. In some implementations, the perception system 155 can perform one or more of the other functions of the autonomous vehicle (e.g., prediction, etc.) described herein.

The memory 920 can store data 930 that can be obtained (e.g., received, accessed, written, manipulated, generated, created, stored, etc.). The data 930 can include, for instance, sensor data, object detection data, failsafe region data, data indicative of a deviation (e.g., preliminary deviation and/or primary deviation), data indicative of one or more machine-learned model(s), such as object detection model(s), 3D localization model(s), maturing/speeding model(s), prediction system model(s), planning model(s), plan validation model(s), and/or vehicle control model(s), and/or other data/information described herein. In some implementations, the computing device(s) 910 can obtain data from one or more memories that are remote from the perception system 155.

The computing device(s) 910 can also include a communication interface 935 used to communicate with one or more other system(s) (e.g., other systems onboard and/or remote from a vehicle, the other systems of FIG. 1, etc.). The communication interface 935 can include any circuits, components, software, etc. for communicating via one or more networks (e.g., 945). In some implementations, the communication interface 935 can include, for example, one or more of a communications controller, receiver, transceiver, transmitter, port, conductors, software and/or hardware for communicating data/information.

According to an aspect of the present disclosure, the perception system 155 can store or include one or more machine-learned models 940. As examples, the machine-learned model(s) 940 can be or can otherwise include the object detection model(s), clustering model(s), 3D localization model(s), maturing/speeding model(s), prediction system model(s), planning model(s), plan validation model(s), and/or vehicle control model(s), and/or other data/information described herein. The machine-learned model(s) 940 can be or include neural networks (e.g., deep neural networks), support vector machines, decision trees, ensemble models, k-nearest neighbors models, Bayesian networks, or other types of models including linear models and/or non-linear models. Example neural networks include recurrent neural networks (e.g., long short-term memory recurrent neural networks, etc.), feed-forward neural networks (e.g., convolutional neural networks, etc.), and/or other forms of neural networks.

In some implementations, the perception system 155 can receive the one or more machine-learned models 940, from the machine learning computing system 950 over the network(s) 945 and can store the one or more machine-learned models 940 in the memory 920 of the perception system 155. The perception system 155 can use or otherwise implement the one or more machine-learned models 940 (e.g., by processor(s) 915). For example, the perception system 155 can implement the machine learned model(s) 940 to determine failsafe region data representing an unexpected path or an unexpected area where a likelihood of the actor following the unexpected path or entering the unexpected area is below a threshold.

The machine learning computing system 950 can include one or more processors 955 and a memory 965. The one or more processors 955 can be any suitable processing device (e.g., a processor core, a microprocessor, an ASIC, a FPGA, a controller, a microcontroller, etc.) and can be one processor or a plurality of processors that are operatively connected. The memory 965 can include one or more non-transitory computer-readable storage media, such as RAM, ROM, EEPROM, EPROM, one or more memory devices, flash memory devices, etc., and/or combinations thereof.

The memory 965 can store information that can be accessed by the one or more processors 955. For instance, the memory 965 (e.g., one or more non-transitory computer-readable storage mediums, memory devices, etc.) can store data 975 that can be obtained (e.g., generated, retrieved, received, accessed, written, manipulated, created, stored, etc.). In some implementations, the machine learning computing system 950 can obtain data from one or more memories that are remote from the machine learning computing system 950.

The memory 965 can also store computer-readable instructions 970 that can be executed by the one or more processors 955. The instructions 970 can be software written in any suitable programming language or can be implemented in hardware. Additionally, or alternatively, the instructions 970 can be executed in logically and/or virtually separate threads on processor(s) 955. The memory 965 can store the instructions 970 that when executed by the one or more processors 955 cause the one or more processors 955 to perform operations. The machine learning computing system 950 can include a communication interface 960, including devices and/or functions similar to that described with respect to the perception system 155.

In some implementations, the machine learning computing system 950 can include one or more server computing devices. If the machine learning computing system 950 includes multiple server computing devices, such server computing devices can operate according to various computing architectures, including, for example, sequential computing architectures, parallel computing architectures, or some combination thereof.

In addition, or alternatively to the model(s) 940 at the perception system 155, the machine learning computing system 950 can include one or more machine-learned model(s) 680. As examples, the machine-learned model(s) 980 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks (e.g., convolutional neural networks), recurrent neural networks (e.g., long short-term memory recurrent neural networks, etc.), and/or other forms of neural networks. The machine-learned models 980 can be similar to and/or the same as the machine-learned models 940, and/or any of the models discussed herein with reference to FIGS. 1 through 8.

As an example, the machine learning computing system 950 can communicate with the perception system 155 according to a client-server relationship. For example, the machine learning computing system 950 can implement the machine-learned models 980 to provide a web service to the perception system 155 (e.g., including on a vehicle, implemented as a system remote from the vehicle, etc.). For example, the web service can provide machine-learned models to an entity associated with a vehicle; such that the entity can implement the machine-learned model(s) (e.g., to perceive and/or classify objects/actors, etc.). Thus, machine-learned models 980 can be located and used at the perception system 155 (e.g., on the vehicle 105, at the operations computing system 195, etc.) and/or the machine-learned models 980 can be located and used at the machine learning computing system 950.

In some implementations, the machine learning computing system 950 and/or the perception system 155 can train the machine-learned model(s) 940 and/or 980 through the use of a model trainer 985. The model trainer 985 can train the machine-learned models 940 and/or 980 using one or more training or learning algorithm(s). The model trainer 985 can perform backwards propagation of errors, supervised training techniques using a set of labeled training data, and/or unsupervised training techniques using a set of unlabeled training data. The model trainer 985 can perform a number of generalization techniques to improve the generalization capability of the models being trained. Generalization techniques include weight decays, dropouts, or other techniques.

The model trainer 985 can train a machine-learned model (e.g., 940 and/or 980) based on a set of training data 990. The training data 990 can include, for example, labeled datasets and/or unlabeled datasets.

In some implementations, the training data 990 can be taken from the same vehicle as that which utilizes the model(s) 940 and/or 980. Accordingly, the model(s) 940 and/or 980 can be trained to determine outputs in a manner that is tailored to that particular vehicle. Additionally, or alternatively, the training data 990 can be taken from one or more different vehicles than that which is utilizing the model(s) 940 and/or 980. The model trainer 985 can be implemented in hardware, firmware, and/or software controlling one or more processors. Additionally, or alternatively, other data sets can be used to train the model(s) (e.g., models 940 and/or 980) including, for example, publicly accessible datasets (e.g., labeled data sets, unlabeled data sets, etc.).

The network(s) 945 can be any type of network or combination of networks that allows for communication between devices. In some implementations, the network(s) 945 can include one or more of a local area network, wide area network, the Internet, secure network, cellular network, mesh network, peer-to-peer communication link and/or some combination thereof and can include any number of wired or wireless links. Communication over the network(s) 945 can be accomplished, for instance, via a network interface using any type of protocol, protection scheme, encoding, format, packaging, etc.

FIG. 9 illustrates one example system 900 that can be used to implement the present disclosure. Other computing systems can be used as well. For example, in some implementations, the perception system 155 can include the model trainer 985 and the training dataset 990. In such implementations, the machine-learned models 940 can be both trained and used locally at the perception system 155 (e.g., at the vehicle 105).

Computing tasks discussed herein as being performed at computing device(s) remote from the vehicle 105 can instead be performed at the vehicle 105 (e.g., via the vehicle computing system 100), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Although many examples are described herein with respect to autonomous vehicles, the disclosed technology is not limited to autonomous vehicles. For instance, any vehicle may utilize the technology described herein for perceiving surroundings of a vehicle using a primary perception system and a secondary perception system. For example, a non-autonomous vehicle may utilize aspects of the present disclosure to determine the presence and/or intention of one or more objects (e.g., vehicles, bicycles, etc.) proximate to a non-autonomous vehicle. Such information may be utilized by a non-autonomous vehicle, for example, to provide informational notifications to an operator of the non-autonomous vehicle. For instance, the non-autonomous vehicle can notify or otherwise warn the operator of the non-autonomous vehicle based on the surprise movement detection. Additionally, or alternatively, the disclosed technology can be implemented and utilized by other computing systems, such as other robotic computing systems.

While the present subject matter has been described in detail with respect to specific example implementations and methods thereof, it will be appreciated that those skilled in the art, upon attaining an understanding of the foregoing can readily produce alterations to, variations of, and equivalents to such implementations. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method, comprising:
   obtaining sensor data comprising a plurality of sensor data points descriptive of an environment of an autonomous vehicle;
   generating, based on the sensor data, primary perception data by a primary perception system, the primary perception data representing a plurality of classifiable objects and a plurality of paths representing tracked motion of the plurality of classifiable objects, wherein each classifiable object is classified by the primary perception system as a predefined class of a plurality of predefined classes of objects;
   generating, by a secondary perception system that is different from the primary perception system, one or more sensor data point clusters and secondary path data based on the plurality of sensor data points, the secondary path data representing tracked motion of the one or more sensor data point clusters; and
   determining fused perception data representing the tracked motion of the plurality of classifiable objects and the tracked motion of one or more unclassifiable objects, wherein the one or more unclassifiable objects are identified by deduplicating the plurality of classifiable objects with the one or more sensor data point clusters.

2. The computer-implemented method of claim 1, wherein the plurality of predefined classes comprises at least one of: (i) a vehicle class, (ii) a pedestrian class, or (iii) a bicycle class.

3. The computer-implemented method of claim 1, wherein the method further comprises:
   predicting one or more predicted paths representing predicted motion of at least one of the plurality of classifiable objects or the plurality of unclassified objects based on the fused perception data;
   determining a motion plan for navigation of the autonomous vehicle based on the fused perception data and the one or more predicted paths; and
   implementing the motion plan to navigate the autonomous vehicle.

4. The computer-implemented method of claim 1, wherein generating the primary perception data comprises:
   identifying, by the primary perception system, the plurality of classifiable objects based on the sensor data;
   determining, by the primary perception system, the plurality of paths representing the tracked motion of the plurality of classifiable objects; and
   classifying, by the primary perception system, each of the plurality of classified objects with respect to the plurality of predefined classes.

5. The computer-implemented method of claim 1, wherein generating the secondary path data comprises:
   determining a clustered sensor data point path for a respective sensor data point cluster by aggregating respective sensor data point paths of each sensor data point within the respective sensor data point cluster.

6. The computer-implemented method of claim 5, wherein generating the secondary path data further comprises:
   validating the secondary path data based on the clustered sensor data point path.

7. The computer-implemented method of claim 6, wherein validating the secondary path data comprises:
   determining a velocity of the cluster sensor data point path; and
   comparing the velocity of the cluster sensor data point path to a velocity threshold.

8. The computer-implemented method of claim 7, further comprising:
   determining that the velocity of the clustered sensor data point path has a velocity magnitude greater than the velocity threshold; and
   in response to determining that the velocity magnitude is greater than the velocity threshold, generating, by the secondary perception system, the secondary path data.

9. The computer-implemented method of claim 1, wherein generating the one or more sensor data point clusters comprises:
   inputting, by the secondary perception system, the plurality of sensor data points into a machine-learned clustering model; and
   in response to inputting the plurality of sensor data points into the machine-learned clustering model, obtaining the one or more sensor data point clusters.

10. The computer-implemented method of claim 9, wherein the machine-learned clustering model comprises an unsupervised clustering model.

11. The computer-implemented method of claim 9, wherein the machine-learned clustering model comprises a connected component clustering model.

12. The computer-implemented method of claim 9, wherein the machine-learned clustering model comprises at least one of a greedy associator model, a long short-term memory model, or an interacting multiple model.

13. The computer-implemented method of claim 1, wherein the sensor data comprises LIDAR data, and wherein the plurality of sensor data points comprises one or more LIDAR sensor data points.

14. The computer-implemented method of claim 1, further comprising:
   removing one or more nonviable sensor data points from the plurality of sensor data points.

15. An autonomous vehicle computing system, comprising:
   a primary perception system configured to receive sensor data comprising a plurality of sensor data points as input and, in response to receipt of the sensor data as input, generate primary perception data representing a plurality of classifiable objects and a plurality of paths representing tracked motion of the plurality of classifiable objects, wherein each classifiable object is classified by the primary perception system as a predefined class of a plurality of predefined classes of objects;

a secondary perception system configured to receive the sensor data comprising the plurality of sensor data points as input, and, in response to receipt of the sensor data as input, generate one or more sensor data point clusters and secondary path data representing tracked motion of the one or more sensor data point clusters;

one or more processors; and one or more non-transitory, computer-readable media storing instructions that, when implemented, cause the one or more processors to perform operations, the operations comprising:

obtaining the sensor data comprising the plurality of sensor data points, the sensor data descriptive of an environment of an autonomous vehicle;

providing the sensor data as input to the primary perception system and, in response to providing the sensor data as input to the primary perception system, obtaining the primary perception data;

providing the sensor data as input to the secondary perception system and, in response to providing the sensor data as input to the secondary perception system, obtaining the or more sensor data point clusters and the secondary path data; and determining fused perception data representing the tracked motion of the plurality of classifiable objects and the tracked motion of one or more unclassifiable objects, wherein the one or more unclassifiable objects are identified by deduplicating the plurality of classifiable objects with the one or more sensor data point clusters.

16. The autonomous vehicle computing system of claim 15, wherein the plurality of predefined classes comprises at least one of: (i) a vehicle class, (ii) a pedestrian class, or (iii) a bicycle class.

17. The autonomous vehicle computing system of claim 15, wherein the operations further comprise:

predicting one or more predicted paths representing predicted motion of at least one of the plurality of classifiable objects or the plurality of unclassified objects based on the fused perception data;

determining a motion plan for navigation of the autonomous vehicle based on the fused perception data and the one or more predicted paths; and implementing the motion plan to navigate the autonomous vehicle.

18. An autonomous vehicle, comprising:

a primary perception system configured to receive sensor data comprising a plurality of sensor data points as input and, in response to receipt of the sensor data as input, generate primary perception data representing a plurality of classifiable objects and a plurality of paths representing tracked motion of the plurality of classifiable objects, wherein each classifiable object is classified by the primary perception system as a predefined class of a plurality of predefined classes of objects;

a secondary perception system configured to receive the sensor data comprising the plurality of sensor data points as input, and, in response to receipt of the sensor data as input, generate one or more sensor data point clusters and secondary path data representing tracked motion of the one or more sensor data point clusters;

one or more processors; and one or more non-transitory, computer-readable media storing instructions that, when implemented, cause the one or more processors to perform operations, the operations comprising:

obtaining the sensor data comprising the plurality of sensor data points, the sensor data descriptive of an environment of the autonomous vehicle;

providing the sensor data as input to the primary perception system and, in response to providing the sensor data as input to the primary perception system, obtaining the primary perception data;

providing the sensor data as input to the secondary perception system and, in response to providing the sensor data as input to the secondary perception system, obtaining the or more sensor data point clusters and the secondary path data; and determining fused perception data representing the tracked motion of the plurality of classifiable objects and the tracked motion of one or more unclassifiable objects, wherein the one or more unclassifiable objects are identified by deduplicating the plurality of classifiable objects with the one or more sensor data point clusters.

19. The autonomous vehicle of claim 18, wherein the plurality of predefined classes comprises at least one of (i) a vehicle class, (ii) a pedestrian class, or (iii) a bicycle class.

20. The autonomous vehicle of claim 18, wherein the operations further comprise:

predicting one or more predicted paths representing predicted motion of at least one of the plurality of classifiable objects or the plurality of unclassified objects based on the fused perception data;

determining a motion plan for navigation of the autonomous vehicle based on the fused perception data and the one or more predicted paths; and implementing the motion plan to navigate the autonomous vehicle.

* * * * *